United States Patent
Roque et al.

(10) Patent No.: US 11,934,882 B2
(45) Date of Patent: Mar. 19, 2024

(54) CLOUD-BASED SYSTEMS FOR OPTIMIZED MULTI-DOMAIN PROCESSING OF INPUT PROBLEMS USING A SERVERLESS REQUEST MANAGEMENT ENGINE NATIVE TO A SERVER CLOUD INFRASTRUCTURE

(71) Applicant: Intergraph Corporation, Madison, AL (US)

(72) Inventors: Julio P. Roque, Coconut Grove, FL (US); Javier Buzzalino, Simpsonville, SC (US); Gregory Louis Bondy, Austin, TX (US); Srinivas Kodali, Memphis, TN (US)

(73) Assignee: Intergraph Corporation, Madison, AL (US)

( * ) Notice: Subject to any disclaimer, the term of this patent is extended or adjusted under 35 U.S.C. 154(b) by 134 days.

(21) Appl. No.: 17/675,454

(22) Filed: Feb. 18, 2022

(65) Prior Publication Data
US 2023/0047692 A1 Feb. 16, 2023

Related U.S. Application Data

(60) Provisional application No. 63/231,997, filed on Aug. 11, 2021.

(51) Int. Cl.
| | |
|---|---|
| *G06F 9/50* | (2006.01) |
| *G06F 9/54* | (2006.01) |
| *G06N 20/00* | (2019.01) |

(52) U.S. Cl.
CPC ............ *G06F 9/505* (2013.01); *G06F 9/5072* (2013.01); *G06F 9/5077* (2013.01); *G06F 9/543* (2013.01);
(Continued)

(58) Field of Classification Search
None
See application file for complete search history.

(56) References Cited

U.S. PATENT DOCUMENTS

| | | |
|---|---|---|
| 2004/0267769 A1 | 12/2004 | Galindo-Legaria et al. |
| 2018/0268302 A1 | 9/2018 | Tosh |

(Continued)

FOREIGN PATENT DOCUMENTS

| | | |
|---|---|---|
| WO | 2020/046981 A1 | 3/2020 |

OTHER PUBLICATIONS

International Search Report and Written Opinion of the International Searching Authority, for International Application No. PCT/US2022/039464, dated Oct. 18, 2022, 15 pages.
(Continued)

*Primary Examiner* — Syed A Roni
(74) *Attorney, Agent, or Firm* — Nutter McClennen & Fish LLP

(57) ABSTRACT

Various embodiments of the present disclosure provide methods, apparatuses, systems, computing devices, computing entities, and/or the like for determining optimized solutions to input problems in a containerized, cloud-based (e.g., serverless) manner. In one embodiment, an example method is provided. The method comprises: receiving a problem type of an input problem originating from a client computing entity; mapping the problem type to one or more selected solver types; generating one or more container instances of one or more compute containers, each compute container corresponding to a selected solver type; generating a problem output using the one or more container instances; and
(Continued)

providing the problem output comprising a solution to the input problem to the client computing entity. In various embodiments, optimized solutions for input problems are determined using a cloud-based multi-domain solver system configured to dynamically allocate computing and processing resources between different solution-determining tasks.

16 Claims, 23 Drawing Sheets
(13 of 23 Drawing Sheet(s) Filed in Color)

(52) U.S. Cl.
CPC .............. *G06F 9/546* (2013.01); *G06F 9/547* (2013.01); *G06F 2209/501* (2013.01); *G06F 2209/5022* (2013.01); *G06F 2209/508* (2013.01); *G06N 20/00* (2019.01)

(56) References Cited

U.S. PATENT DOCUMENTS

| | | |
|---|---|---|
| 2020/0073739 A1 | 3/2020 | Rungta et al. |
| 2020/0327394 A1 | 10/2020 | Hultgren et al. |
| 2021/0081720 A1 | 3/2021 | Polleri et al. |
| 2023/0047230 A1 | 2/2023 | Roque et al. |
| 2023/0048306 A1 | 2/2023 | Roque et al. |

OTHER PUBLICATIONS

Menouer, Sukhija, Darmon: "Towards a Parallel Constraint Solver for Cloud Computing Environments", 2019 IEEE Fifth International Conference on Big Data Computing Service and Applications (Bigdataservice), IEEE, Apr. 4, 2019 (Apr. 4, 2019), pp. 195-198; XP033621103, [retrieved on Sep. 24, 2019] the whole document.
Rajrup Ghosh et al. discloses "Distributed Scheduling of Event Analytics across Edge and Cloud". (Year: 2017).
Werner Kurschl et al. ("Concepts and Requirements fora Cloud-based Optimization Service" (Year: 2014).

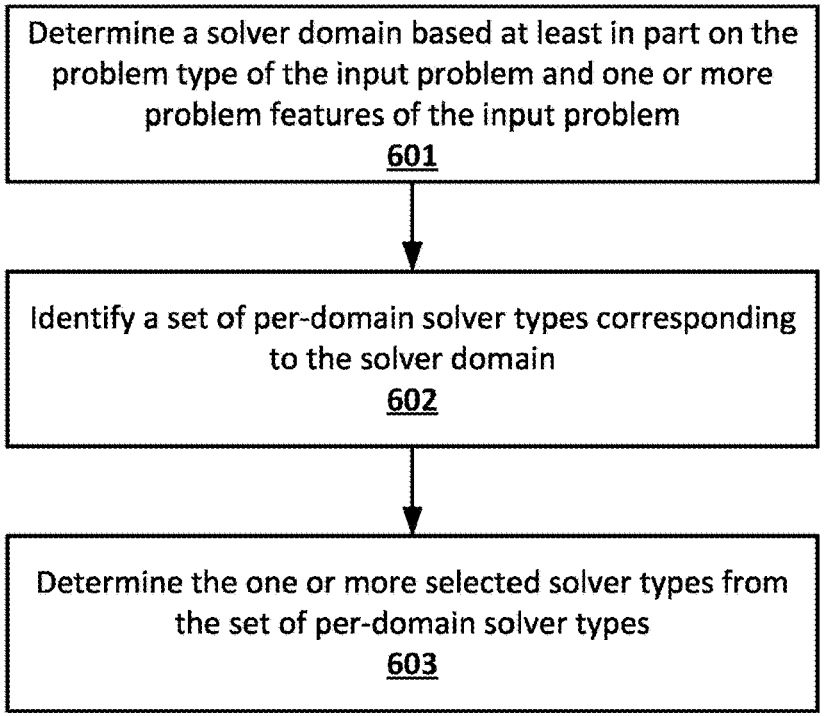

```
┌─────────────────────────────────────────────┐
│ Determine a solver domain based at least in │
│ part on the problem type of the input       │
│ problem and one or more problem features    │
│ of the input problem                        │
│                    601                      │
└─────────────────────────────────────────────┘
                     │
                     ▼
┌─────────────────────────────────────────────┐
│ Identify a set of per-domain solver types   │
│ corresponding to the solver domain          │
│                    602                      │
└─────────────────────────────────────────────┘
                     │
                     ▼
┌─────────────────────────────────────────────┐
│ Determine the one or more selected solver   │
│ types from the set of per-domain solver     │
│ types                                       │
│                    603                      │
└─────────────────────────────────────────────┘
```

FIG. 6

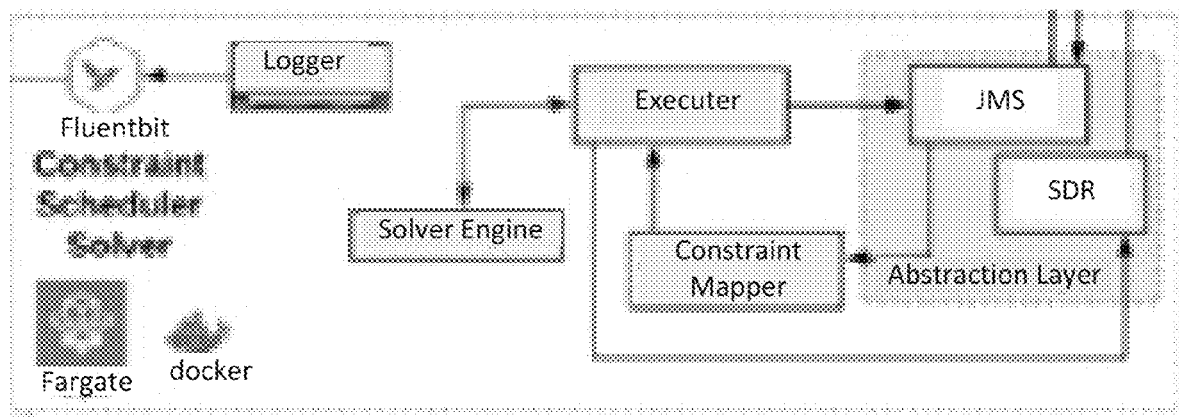
FIG. 13A    1004

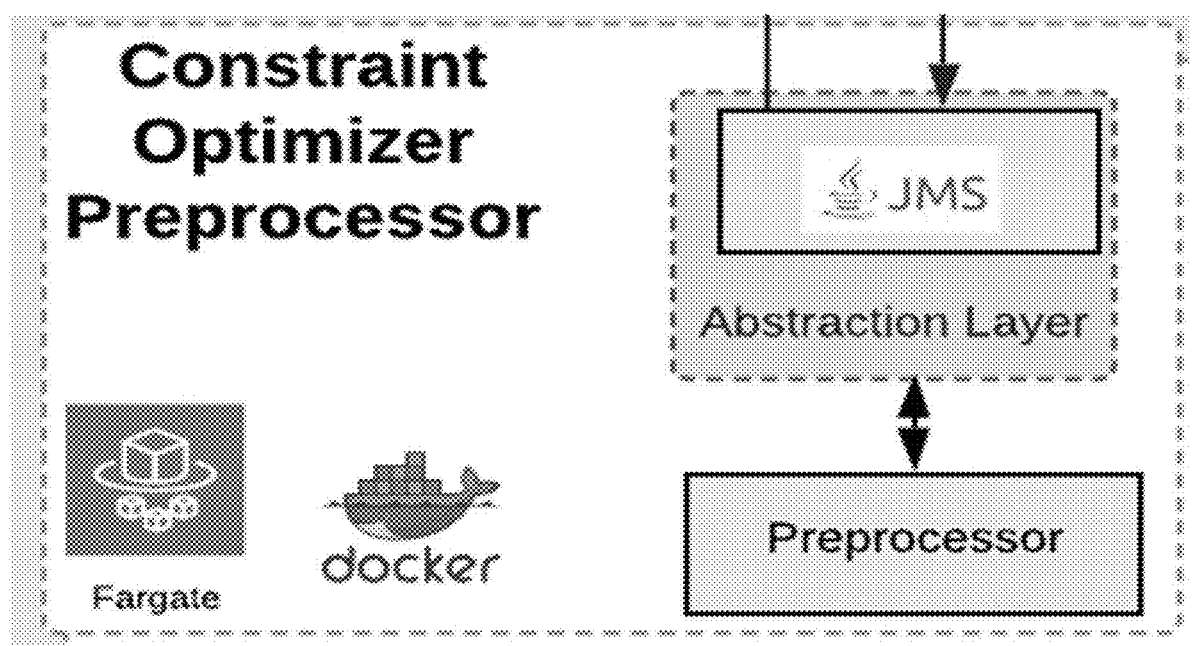
FIG. 14    1006

US 11,934,882 B2

CLOUD-BASED SYSTEMS FOR OPTIMIZED MULTI-DOMAIN PROCESSING OF INPUT PROBLEMS USING A SERVERLESS REQUEST MANAGEMENT ENGINE NATIVE TO A SERVER CLOUD INFRASTRUCTURE

CROSS-REFERENCE TO RELATED APPLICATION(S)

This patent application claims the benefit of U.S. Provisional Patent Application No. 63/231,997 entitled CLOUD-BASED SYSTEMS FOR OPTIMIZED MULTI-DOMAIN PROCESSING OF INPUT PROBLEMS filed Aug. 11, 2021, which is hereby incorporated herein by reference in its entirety.

BACKGROUND

Various embodiments of the present disclosure address technical challenges related to leveraging a cloud-based system architecture to determine optimized solutions to a plurality of problems belonging to different problem domains. Various embodiments of the present disclosure make important technical contributions to the operational efficiency of determining optimized solutions to the plurality of problems and communication of such optimized solutions.

BRIEF SUMMARY

In general, various embodiments of the present disclosure provide methods, apparatuses, systems, computing devices, computing entities, and/or the like for determining optimized solutions to input problems based at least in part on execution of one or more container instances of one or more compute containers each corresponding to a solver type. Various embodiments are configured for determining optimized solutions for input problems of a variety of problem types, and in particular, input problems that may be polynomial problems (P problems) or nondeterministic polynomial problems (NP problems). In various embodiments, a cloud-based multi-domain solver system is configured to receive a type-agnostic problem solving application programming interface (API) request defining an input problem and generating one or more container instances of one or more compute containers each corresponding to a solver type. Each container instance executes according to a solver type to determine an optimized solution to the defined input problem. The cloud-based multi-domain solver system is configured to then provide an optimized solution to the defined input problem via a type-agnostic problem solution API response. In various embodiments, the cloud-based multi-domain solver system intelligently scales a count of container instances that are executing based at least in part on a variety of factors, including availability and consumption of computing and processing resources and a volume of type-agnostic problem solving API requests received. Thus, various embodiments provide technical advantages in the flexible and elastic determination of optimized solutions for a plurality of input problems.

In accordance with one aspect, a method is provided. In one embodiment, the method includes receiving a problem type of an input problem originating from a client computing entity, mapping the problem type to one or more selected solver types, and generating one or more container instances of one or more compute containers. Each compute container corresponds to a selected solver type. The method further includes generating a problem output using the one or more container instances and providing the problem output to the client computing entity. The problem output comprises an optimized solution to the input problem, wherein the problem output may be used to perform one or more prediction-based actions.

In various embodiments, mapping the problem type to one or more selected solver types includes determining a solver domain based at least in part on the problem type of the input problem and one or more problem features of the input problem, identifying a set of per-domain solver types associated with the solver domain, and determining the one or more selected solver types from the set of per-domain solver types. In various embodiments, the problem type of the input problem and the one or more problem features of the input problem are received via a type-agnostic problem solving application programming interface (API) request, and the problem output is provided to the client computing entity via a type-agnostic problem solution API response. In various embodiments, the type-agnostic problem solving API request includes a plurality of static fields each configured to describe problem features across different problem types. In various embodiments, determining the selected solver types from the set of per-domain solver types includes providing one or more problem features of the input problem to a solver selection machine learning model for the problem type that is configured to determine the selected solver types from the set of per-domain solver types based at least in part on the problem features of the input problem.

In various embodiments, the problem type of the input problem is received at a serverless request management engine native to a server cloud infrastructure and corresponding to one of one or more availability zones. In various embodiments, the one or more container instances are managed by a serverless container management engine that is native to a server cloud infrastructure. The serverless container management engine is configured to scale a total count of container instances based at least in part on a total count of the selected solver types. In various embodiments, an inbound problem queue is updated to identify the input problem, and the serverless container management engine is configured to scale a total count of container instances for the one or more selected solver types based at least in part on a number of problems identified by the inbound problem queue.

In various embodiments, generating the problem output includes receiving one or more container outputs generated based at least in part on execution of the one or more container instances and generating the problem output based at least in part on the one or more container outputs. In various embodiments, the method further includes monitoring execution of each container instance during each execution iteration and halting the execution of a container instance if a per-iteration optimization gain of the execution iteration fails to satisfy a configurable per-iteration optimization gain threshold. Execution of a container instance is configured to generate in parallel a container output for each of one or more problems identified by an inbound problem queue.

In accordance with another aspect, a cloud-based system is provided. The cloud-based system includes one or more processors and one or more memory storage areas which are configured to be dynamically allocated in a server-less manner. In one embodiment, the cloud-based system is configured for receiving a problem type of an input problem originating from a client computing entity, mapping the problem type to one or more selected solver types, and generating one or more container instances of one or more compute containers. Each compute container corresponds to a selected solver type. The cloud-based system is further configured for generating a problem output using the one or more container instances and providing the problem output to the client computing entity. The problem output comprises an optimized solution to the input problem, wherein the problem output may be used to perform one or more prediction-based actions.

In accordance with yet another aspect, a computer program product is provided. The computer program product comprises at least one non-transitory computer-readable storage medium having computer-readable program code portions stored therein. The computer-readable program code portions are configured for receiving a problem type of an input problem originating from a client computing entity, mapping the problem type to one or more selected solver types, and generating one or more container instances of one or more compute containers. Each compute container corresponds to a selected solver type. The computer-readable program code portions are further configured for generating a problem output using the one or more container instances and providing the problem output to the client computing entity. The problem output comprises an optimized solution to the input problem, wherein the problem output may be used to perform one or more prediction-based actions.

In accordance with another aspect, a computer-implemented method, a cloud-based system, and a computer program product involve processes including receiving a problem type of an input problem originating from a client computing entity at a serverless request management engine native to a server cloud infrastructure, causing by the serverless request management engine within the server cloud infrastructure execution of a container instance of a compute container corresponding to a solver type for the problem type, receiving a problem output from the container instance comprising an optimized solution to the input problem, and providing, by the serverless request management engine, the problem output for transmission to the client computing entity.

In various alternative embodiments, the container instance may be one of a plurality of container instances, each container instance corresponding to a different solver type for the problem type. The processes also may involve determining a solver domain based at least in part on the problem type of the input problem and one or more problem features of the input problem, identifying a set of per-domain solver types associated with the solver domain, and determining the one or more solver types from the set of per-domain solver types. The problem type of the input problem and the one or more problem features of the input problem may be received via a type-agnostic problem solving application programming interface (API) request, in which case the problem output may be provided to the client computing entity via a type-agnostic problem solution API response. The type-agnostic problem solving API request may include a plurality of static fields each configured to describe problem features across different problem types. Determining the selected solver types from the set of per-domain solver types may involve providing one or more problem features of the input problem to a solver selection machine learning model for the problem type that is configured to determine the selected solver types from the set of per-domain solver types based at least in part on the problem features of the input problem. The serverless request management engine may correspond to of one or more availability zones. The serverless container management engine may be configured to scale a total count of container instances based at least in part on a total count of the solver types. An inbound problem queue may be updated to identify the input problem, in which case the serverless container management engine may be configured to scale a total count of container instances for the one or more solver types based at least in part on a number of problems identified by the inbound problem queue. Generating the problem output may involve receiving one or more container outputs generated based at least in part on execution of the container instance and generating the problem output based at least in part on the one or more container outputs. The processes may further include monitoring execution of each container instance during each execution iteration and halting the execution of a container instance if a per-iteration optimization gain of the execution iteration fails to satisfy a configurable per-iteration optimization gain threshold. Execution of a container instance may be configured to generate in parallel a container output for each of one or more problems identified by an inbound problem queue.

Additional embodiments may be disclosed and claimed.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Figure 1:
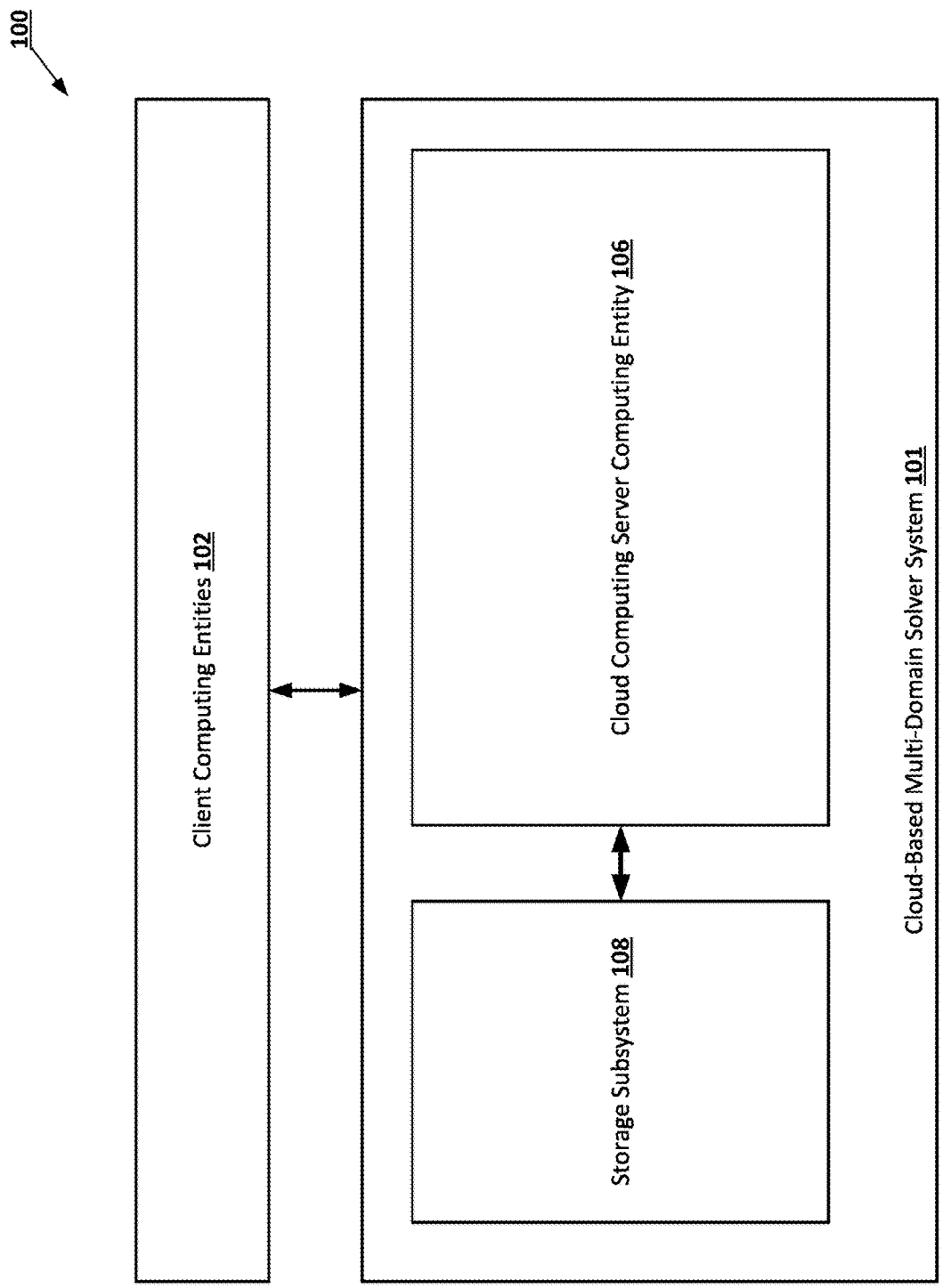
Figure 2:
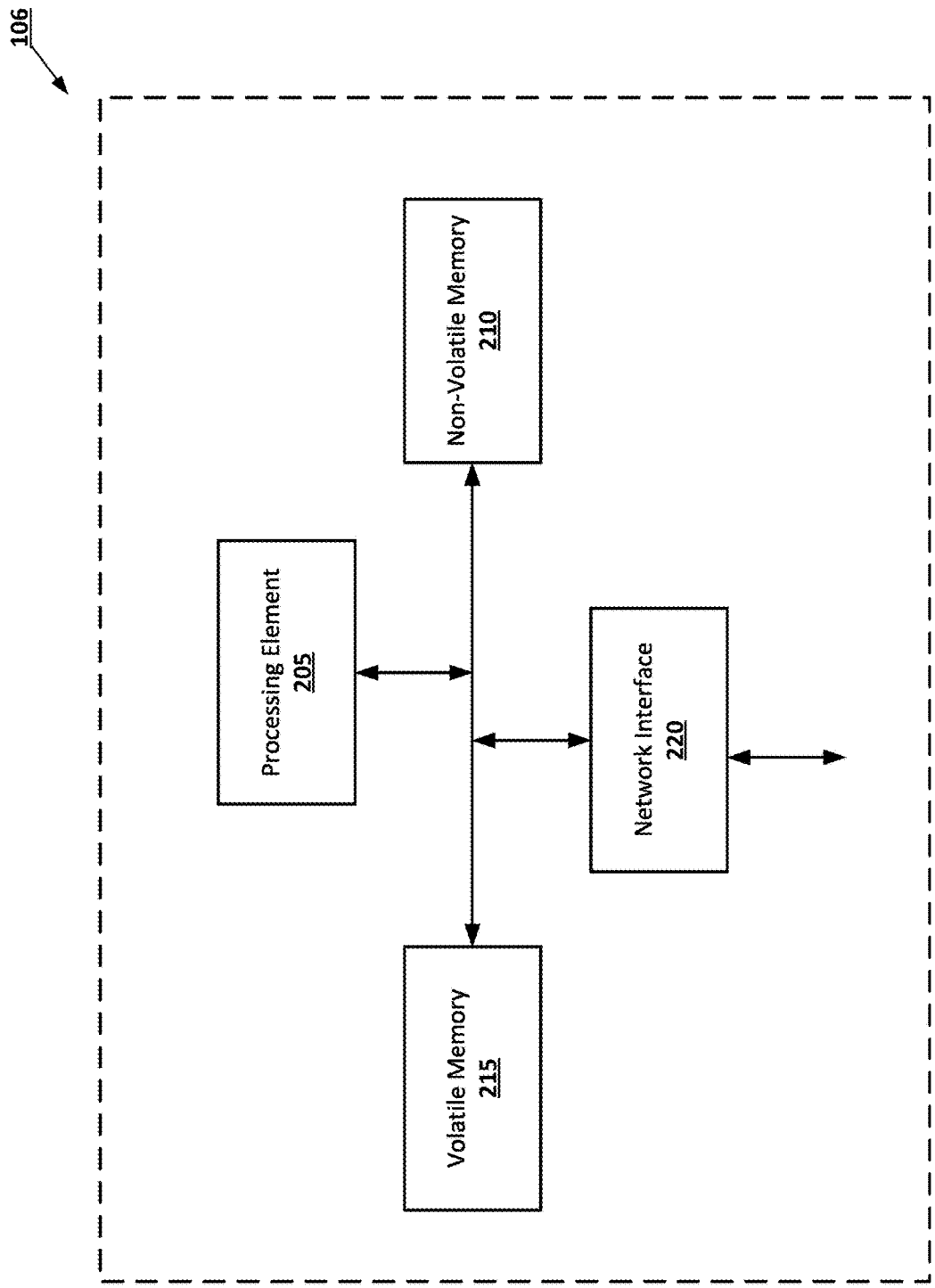
Figure 3:
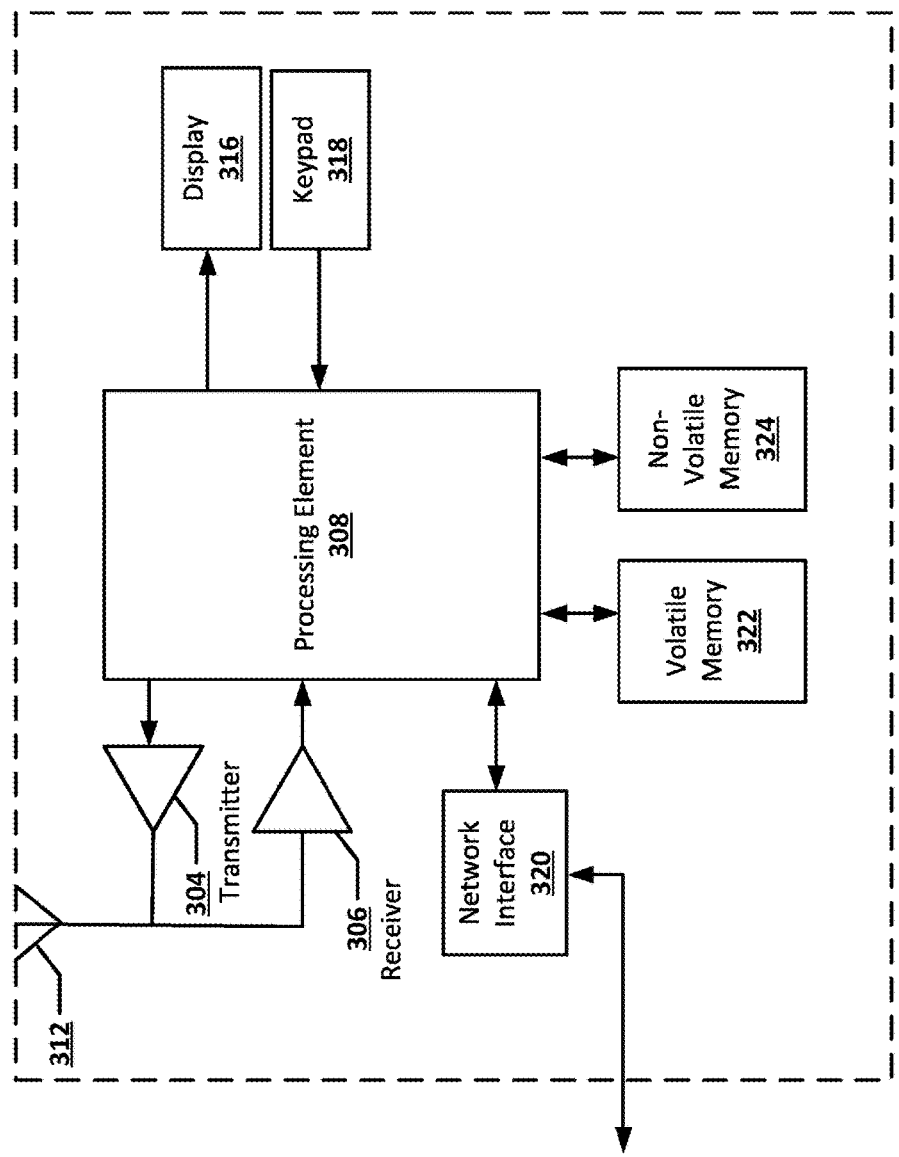
Figure 4:
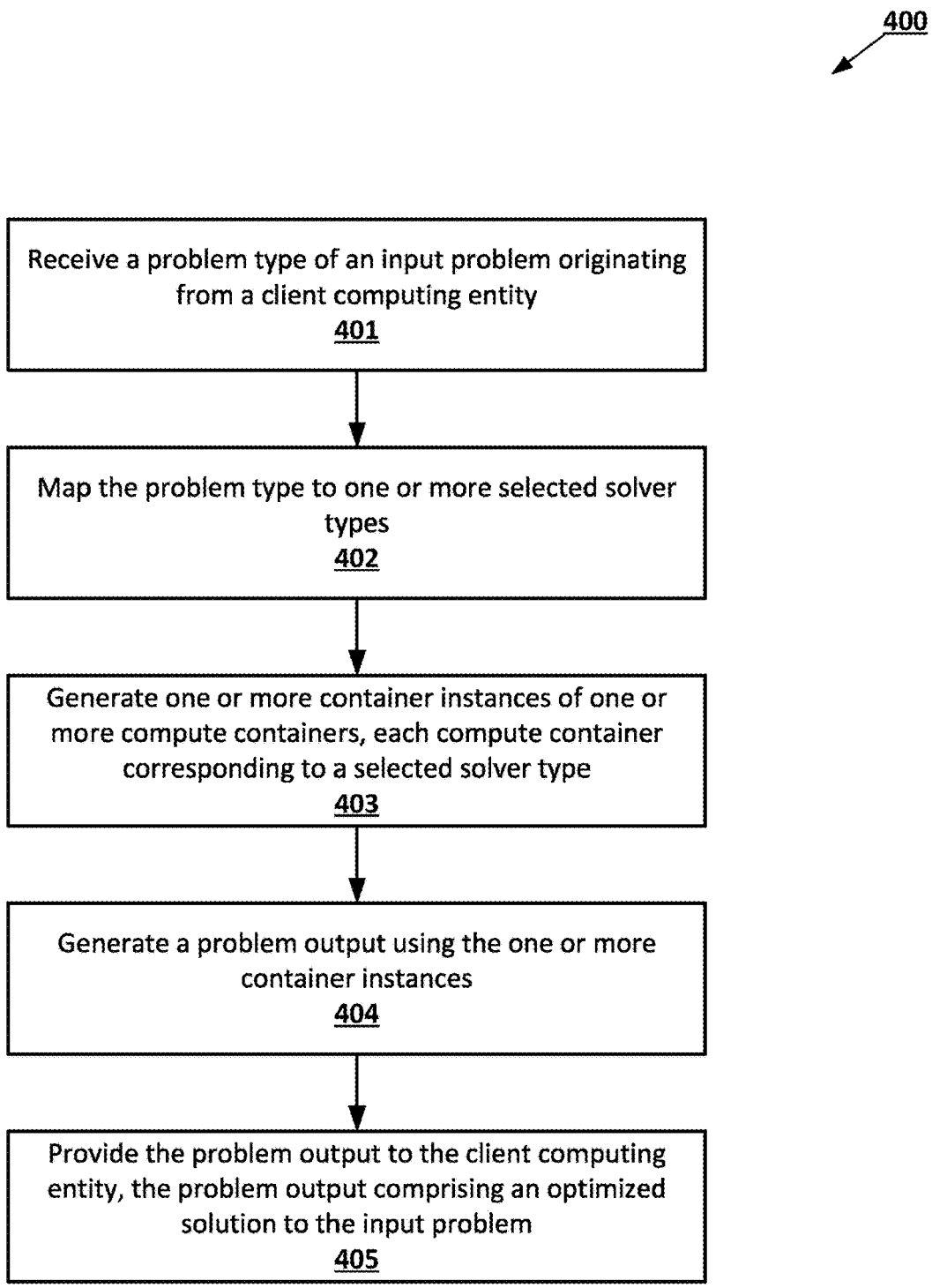
Figure 5A:
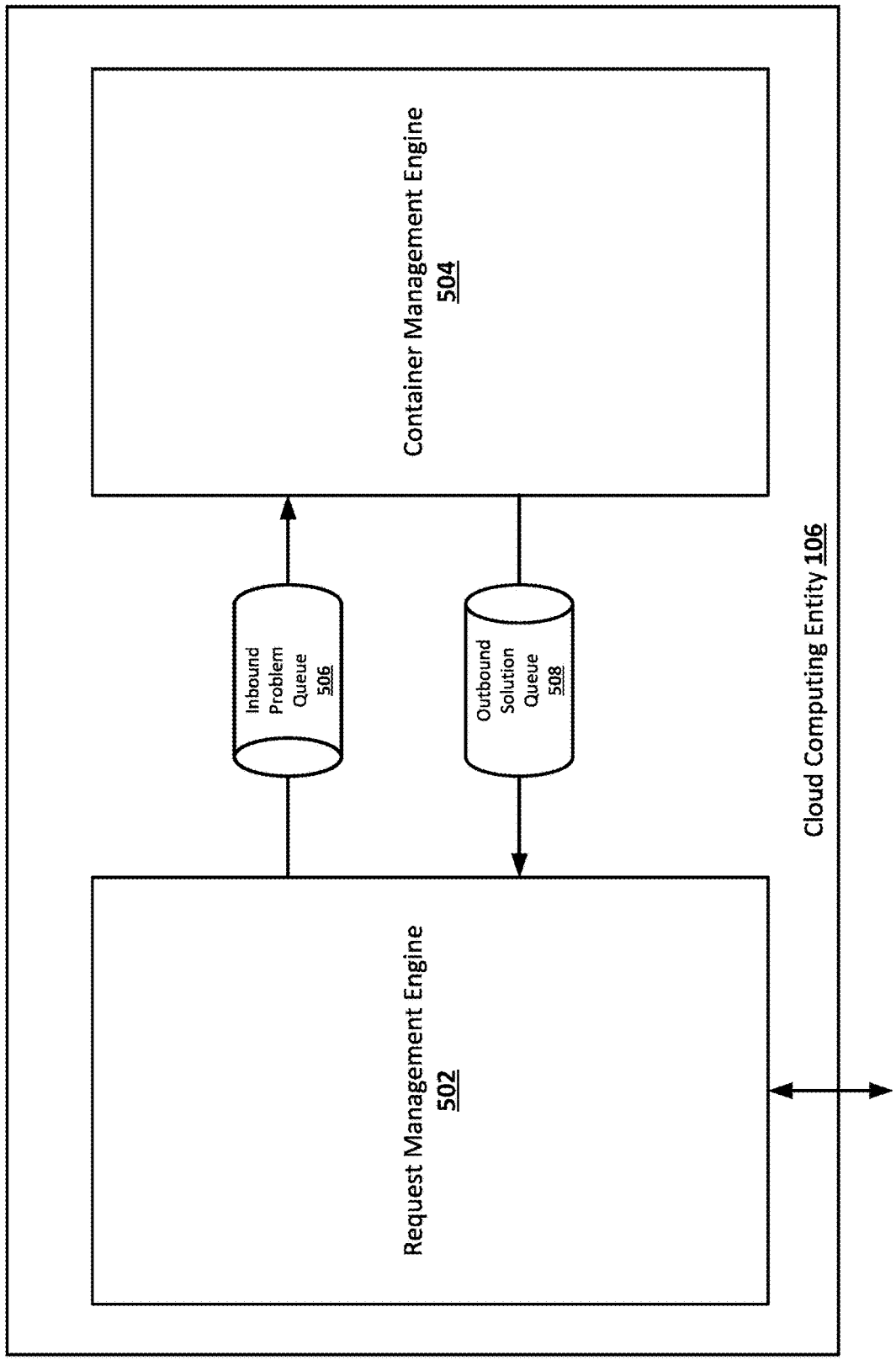
Figure 5B:
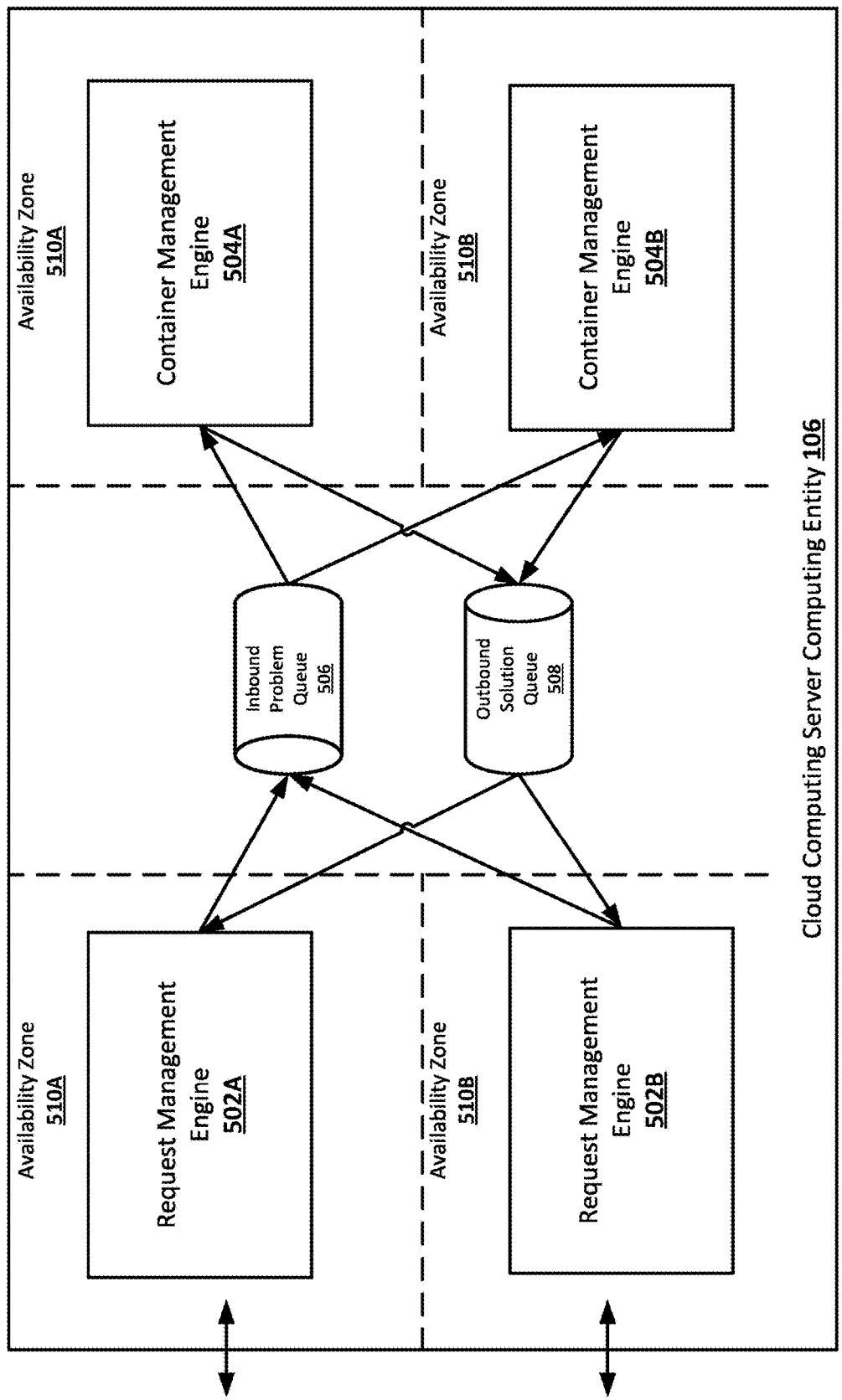
Figure 7:
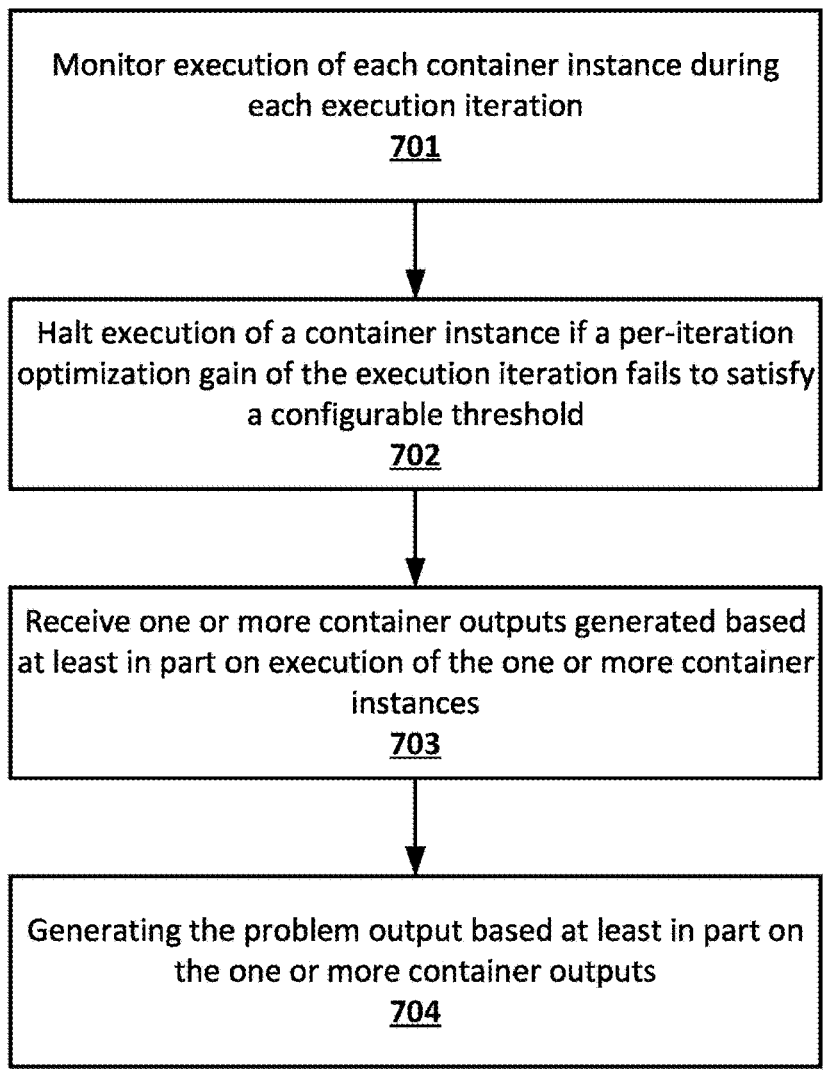
Figure 8:
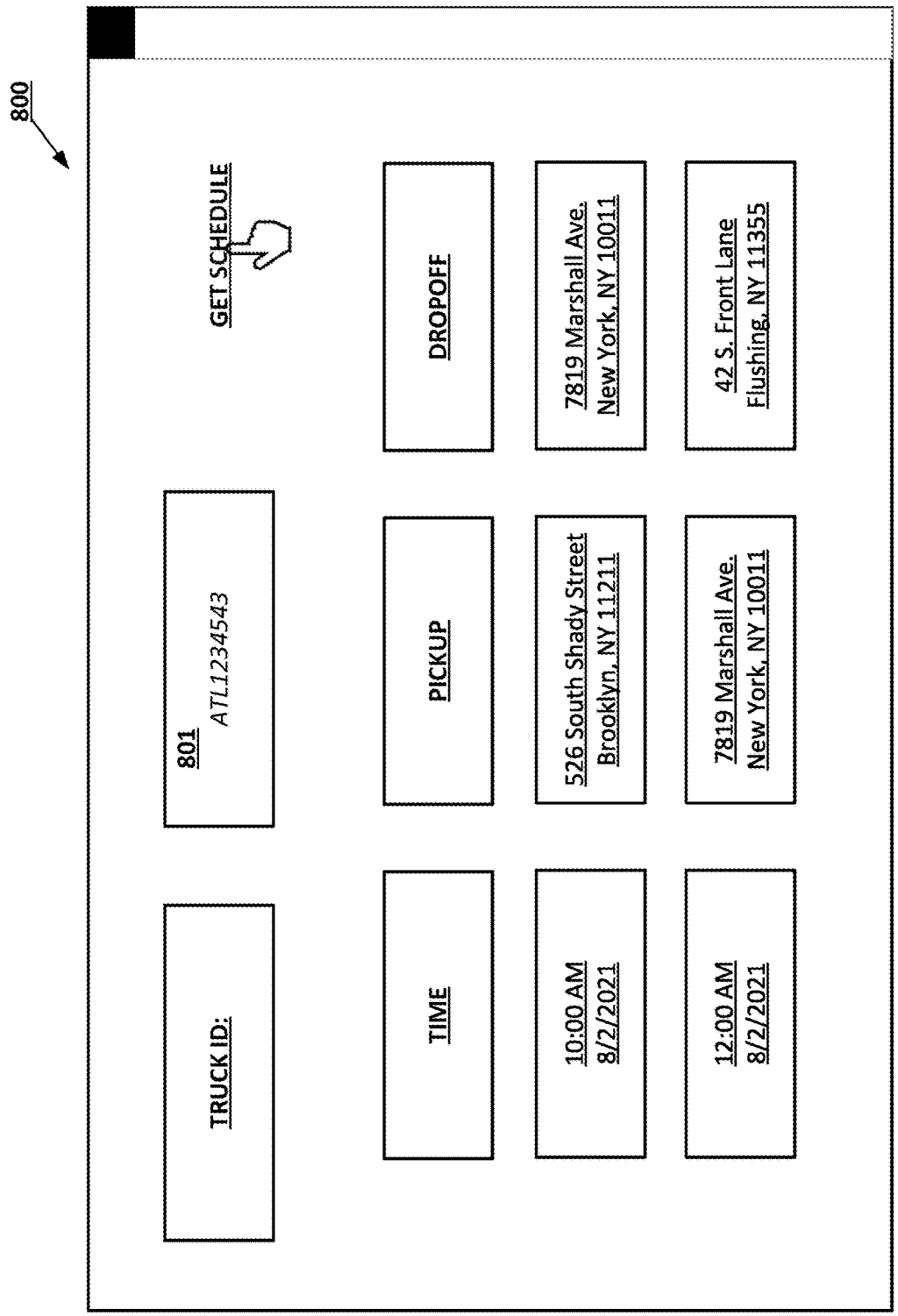
Figure 9:
Figure 10:
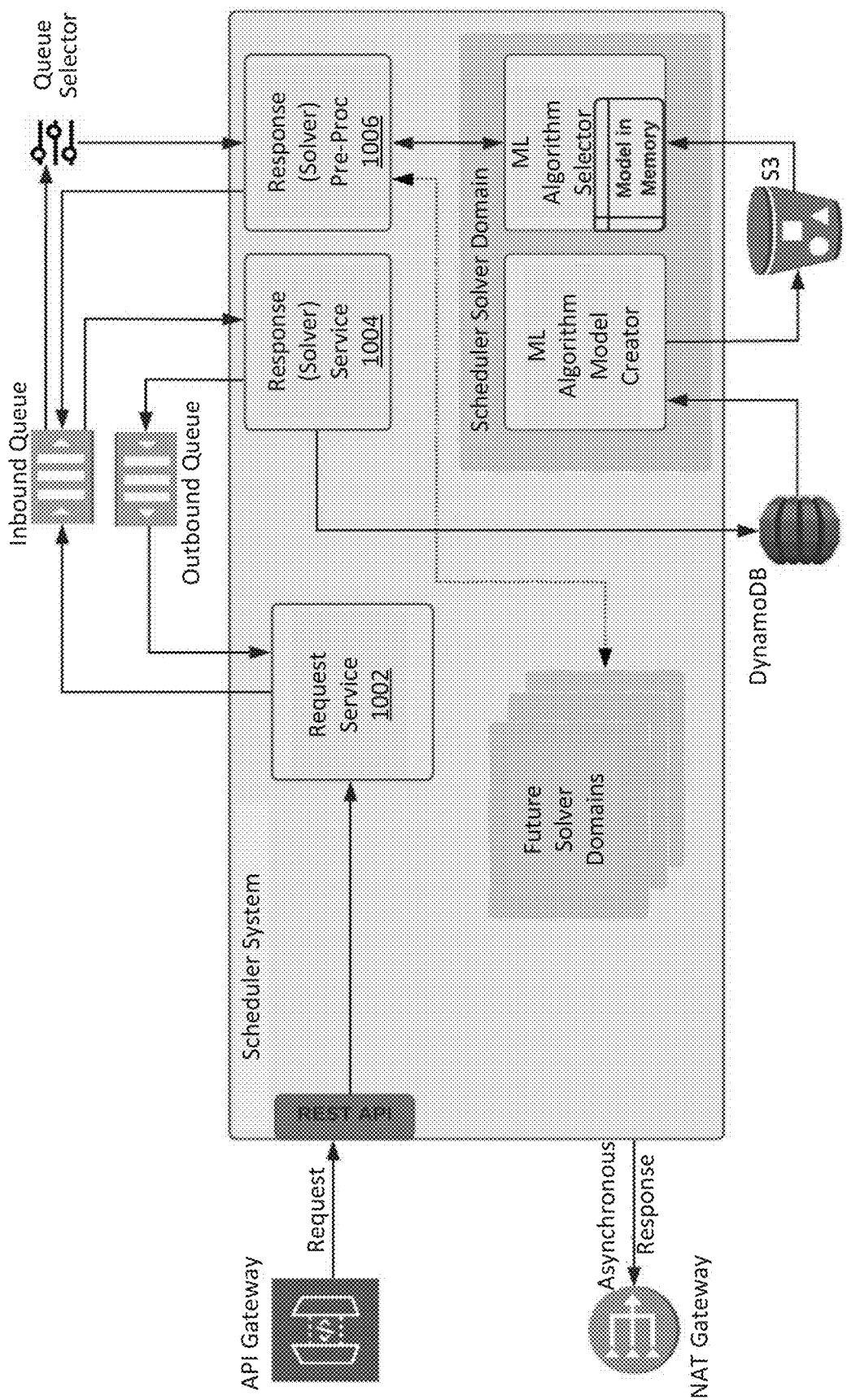
Figure 11:
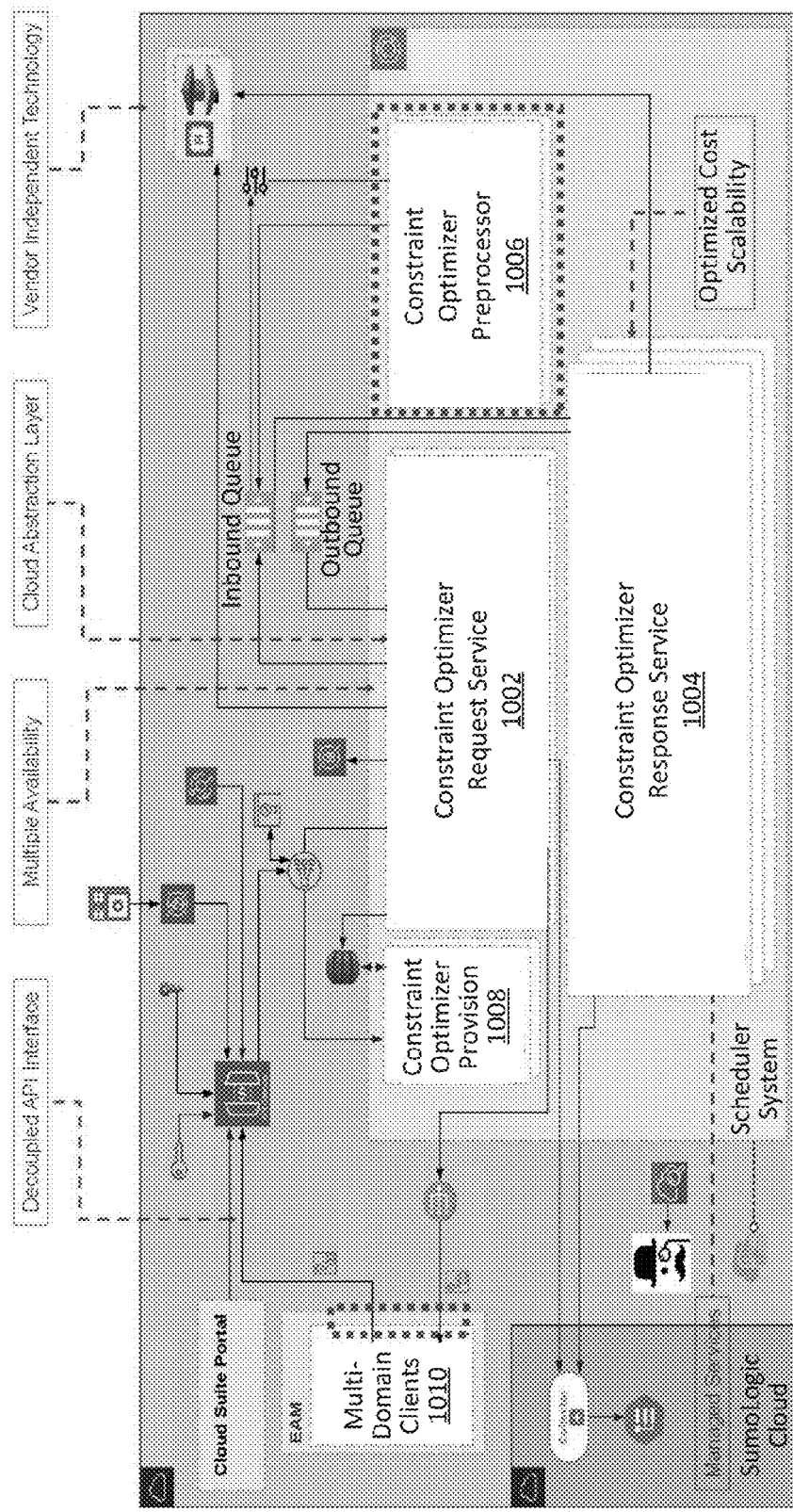
Figure 12A:
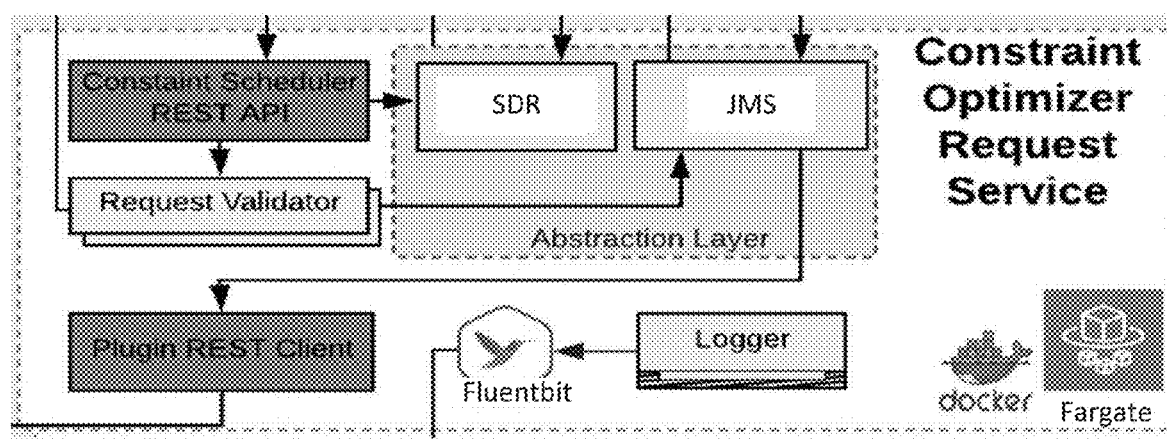
Figure 12B:
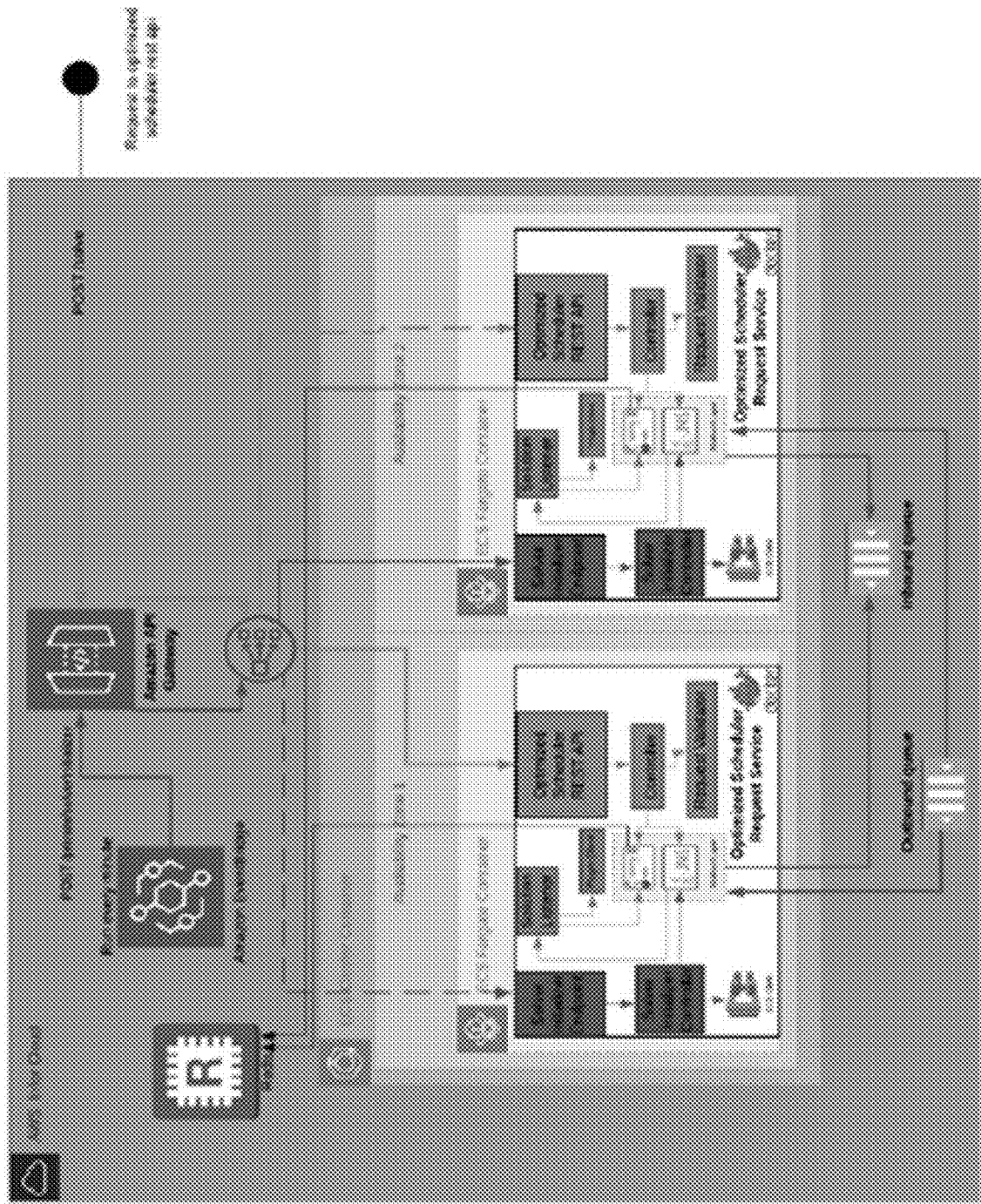
Figure 13B:
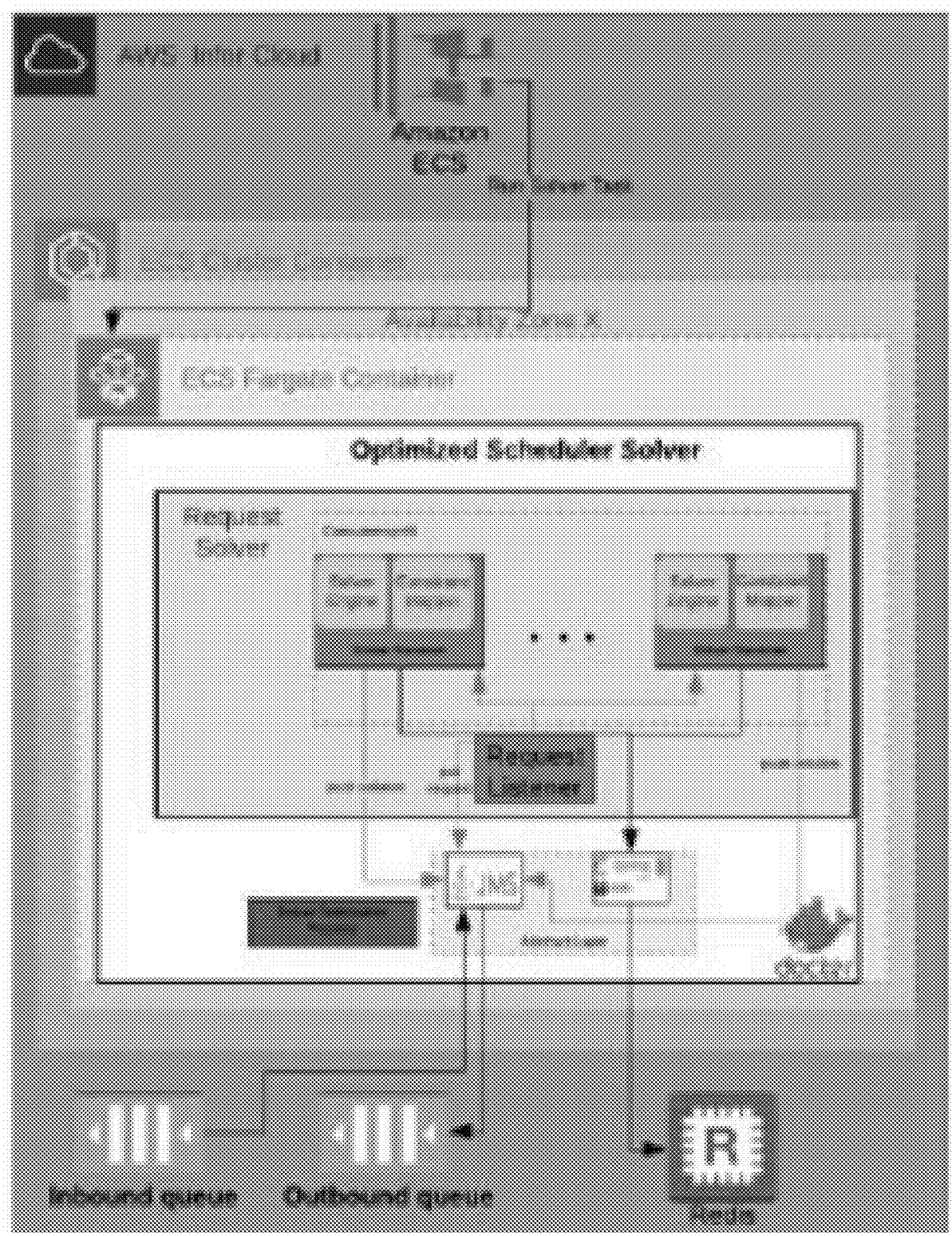
Figure 13C:
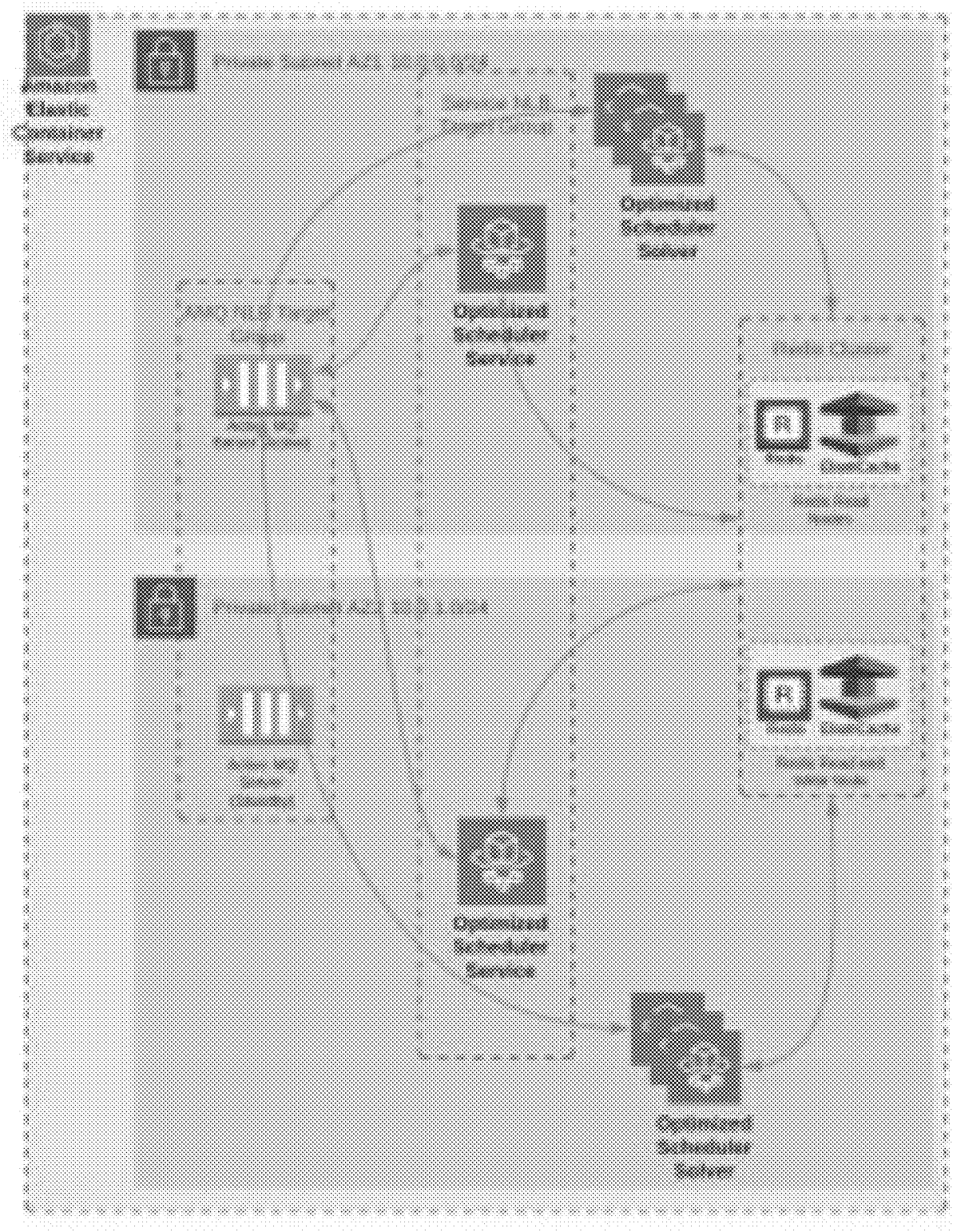
Figure 13D:
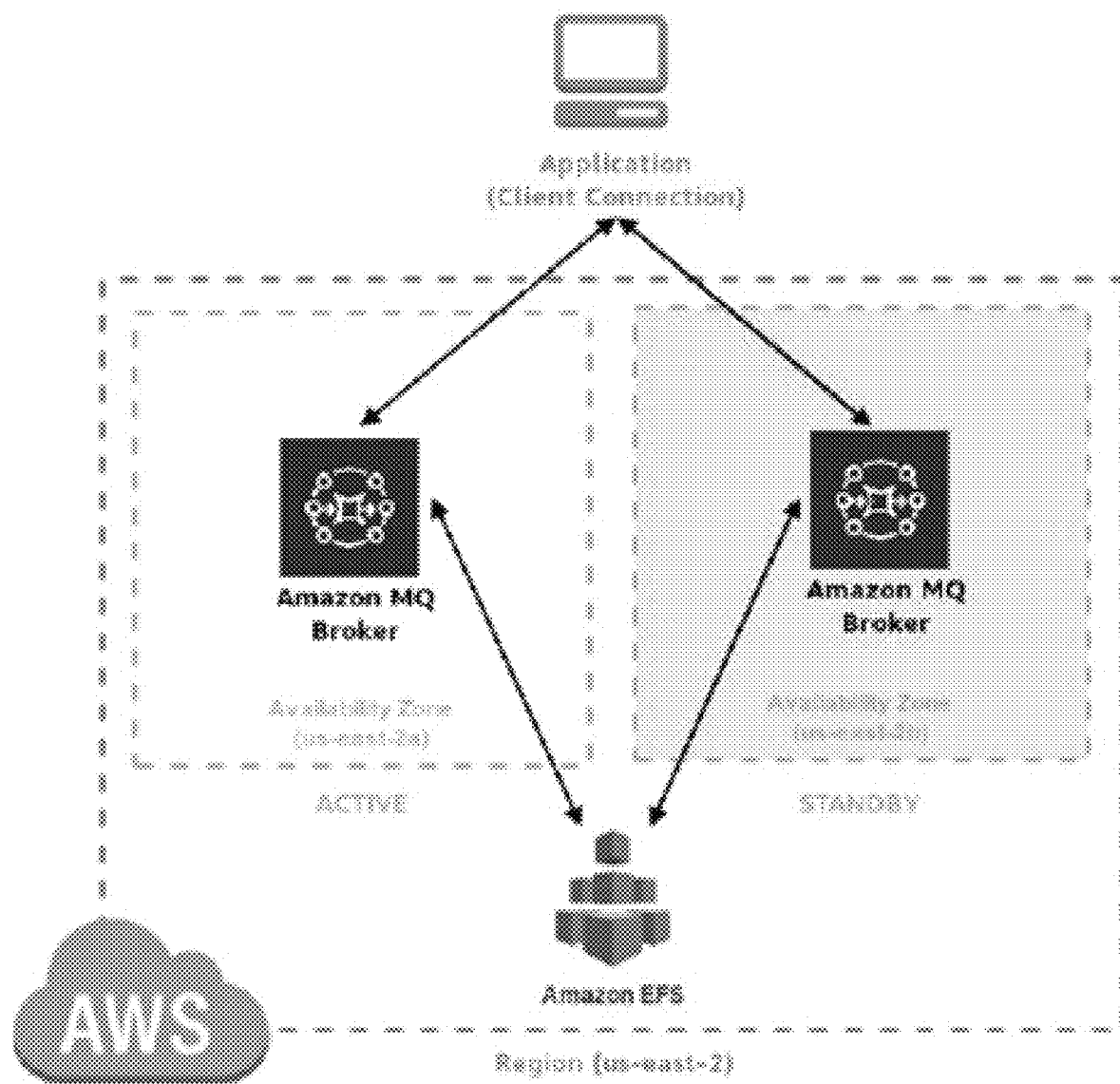
Figure 15:
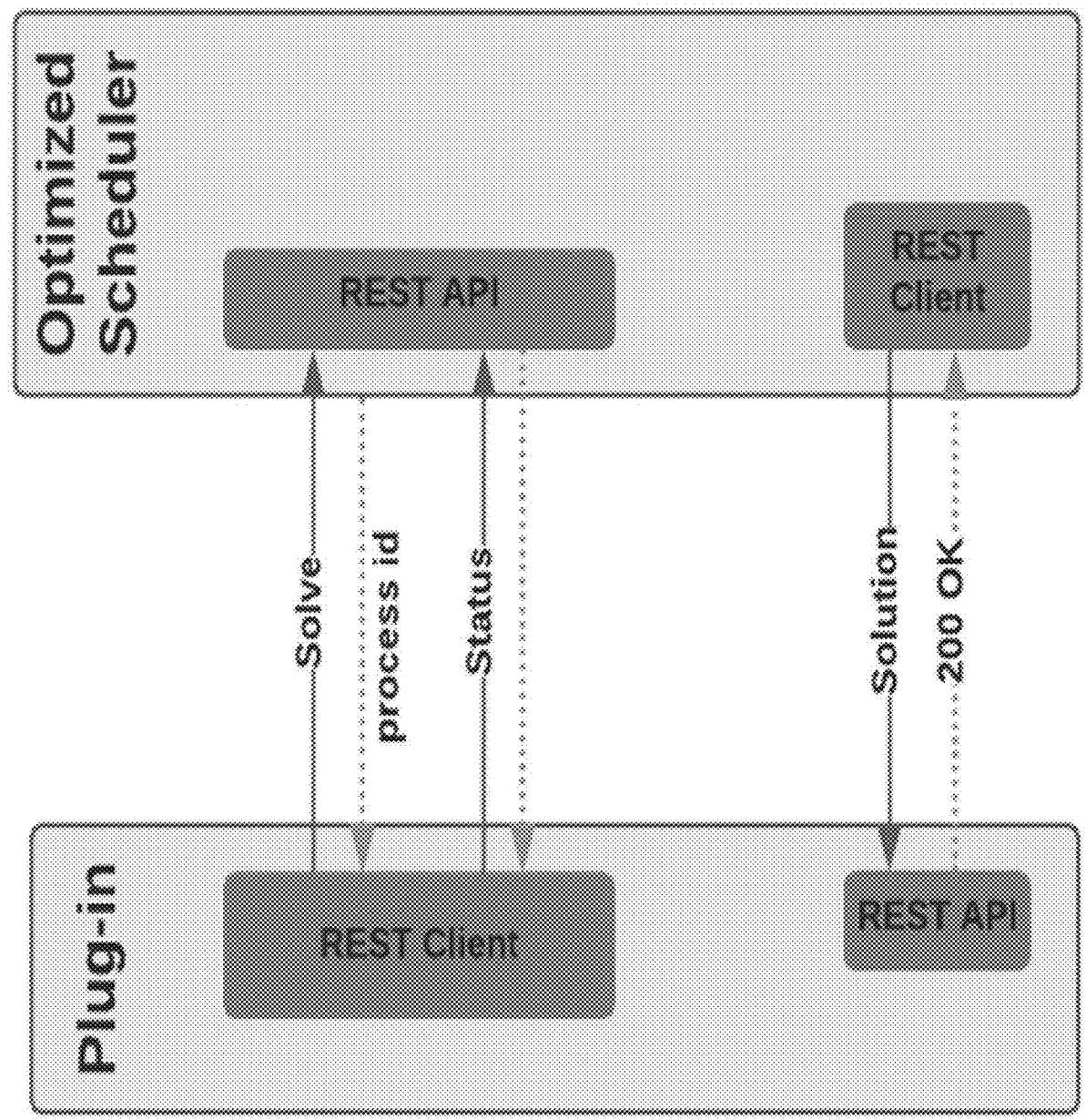
Figure 16:
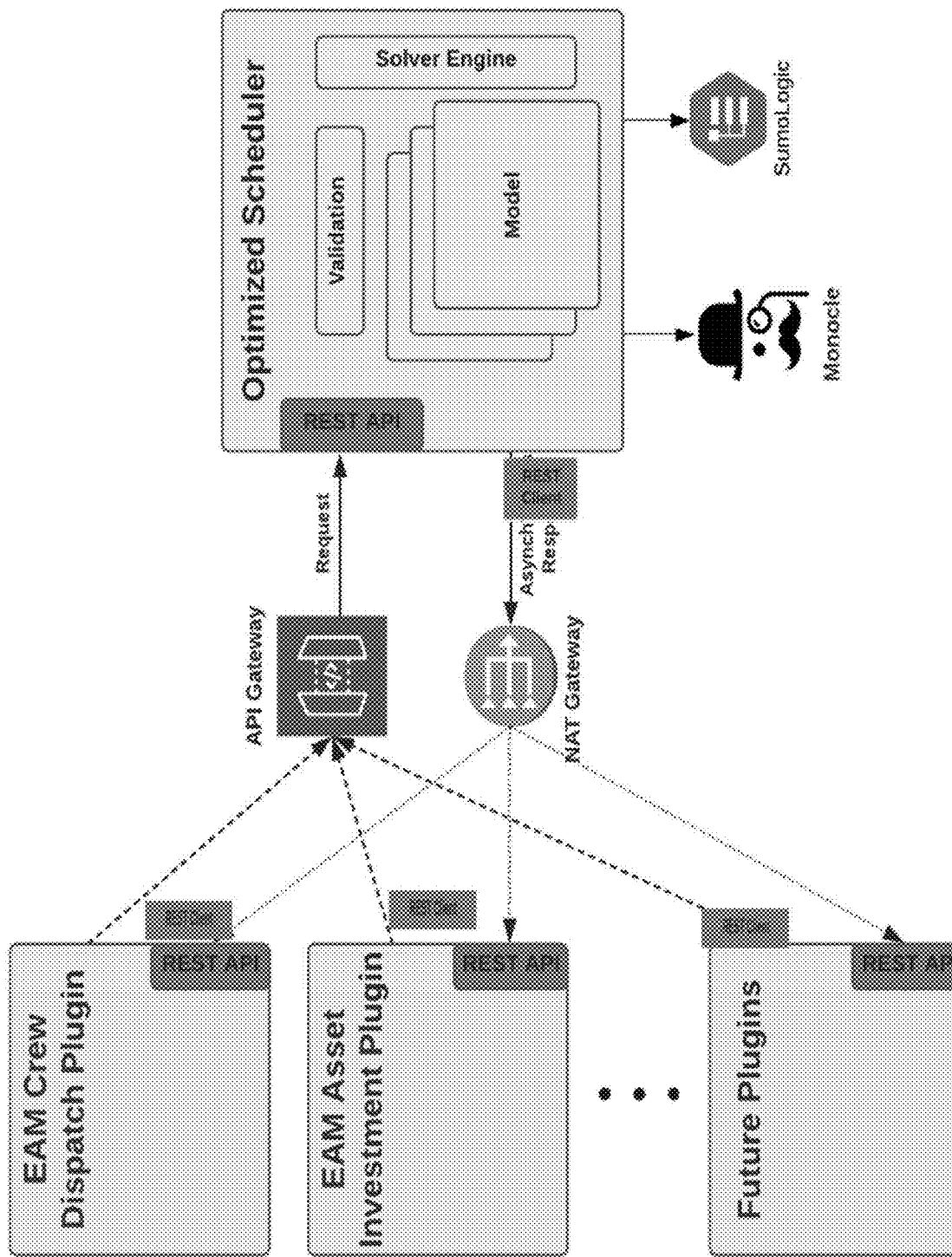
Figure 17:
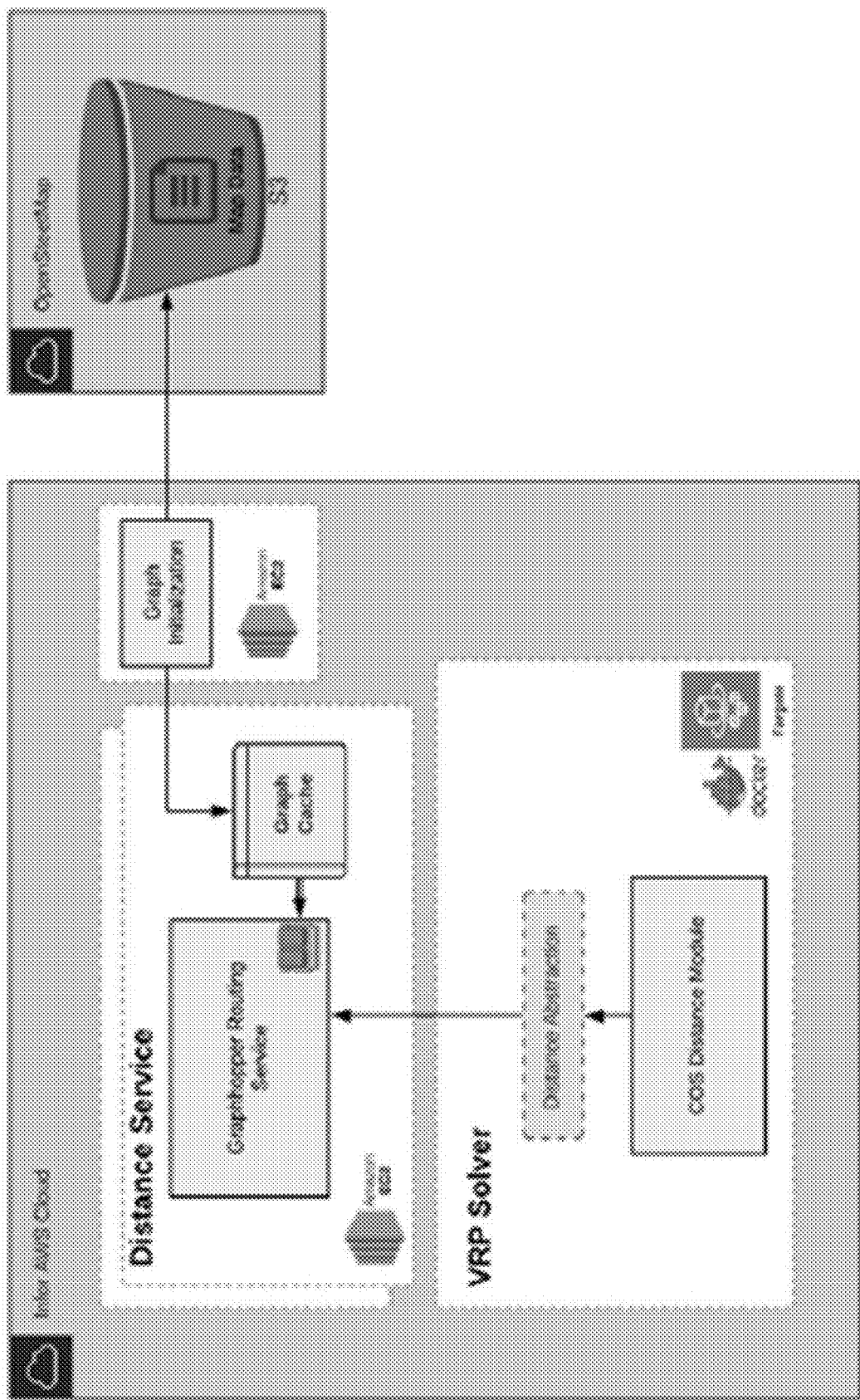
Figure 18:
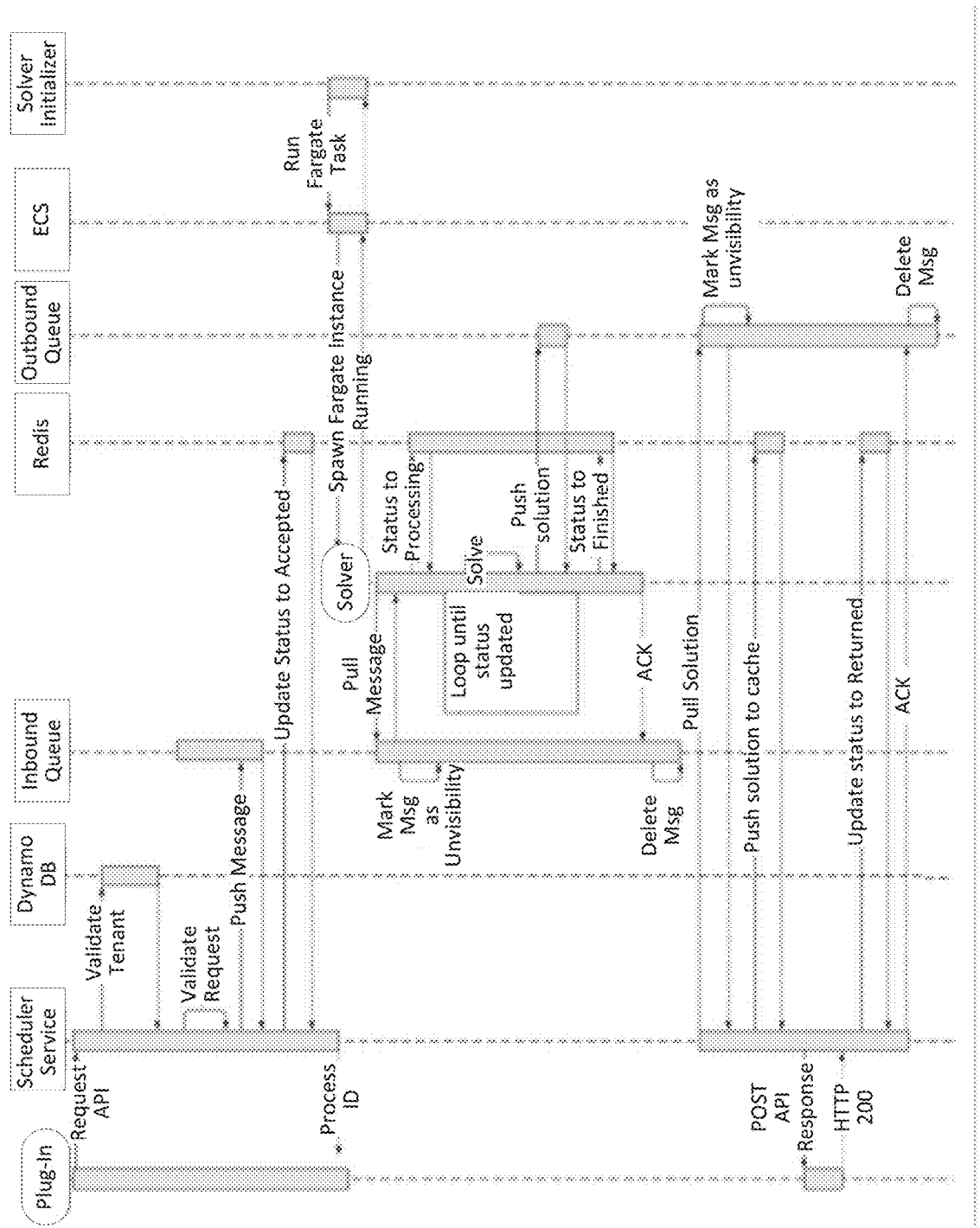

Having thus described the present disclosure in general terms, reference will now be made to the accompanying drawings, which are not necessarily drawn to scale, and wherein:

FIG. 1 provides an exemplary overview of a system architecture that can be used to practice embodiments of the present disclosure in accordance with some embodiments discussed herein;

FIG. 2 provides an example cloud computing server computing entity, in accordance with some embodiments discussed herein;

FIG. 3 provides an example client computing entity, in accordance with some embodiments discussed herein;

FIG. 4 provides a flowchart diagram of an example process for determining an optimized solution for an input problem requested by a client computing entity, in accordance with some embodiments discussed herein;

FIGS. 5A-B provide block diagrams of a cloud computing server computing entity, in accordance with some embodiments discussed herein;

FIG. 6 provides a flowchart diagram of an example process for mapping the input problem to one or more selected solver types in accordance with some embodiments discussed herein;

FIG. 7 provides a flowchart diagram of an example process for generating a problem output for the input problem based at least in part on execution of one or more container instances is the cloud-based multi-domain solver system in accordance with some embodiments discussed herein;

FIG. 8 provides an operational example of a prediction output user interface in accordance with some embodiments discussed herein;

FIG. 9 is a legend of symbols used throughout FIGS. 10-18;

FIG. 10 is a schematic diagram showing details of a cloud-based multi-domain solver system 101 in accordance with various embodiments;

FIG. 11 is a schematic diagram showing additional details of the cloud-based multi-domain solver system 101 of FIG. 10 and in particular how the various components are logically and physically interconnected within the cloud deployment environment;

FIG. 12A is a schematic diagram showing details of the request service block of FIG. 11;

FIG. 12B is a schematic diagram showing two request service instances running in separate availability zones within a container;

FIG. 13A is a schematic diagram showing details of the response (solver) service block of FIG. 11;

FIG. 13B is a schematic diagram showing multiple spawned solver instances running in an availability zone within a container;

FIG. 13C is a schematic diagram showing Elastic Load Balancing for running an independent copy of each application stack in two Availability Zones;

FIG. 13D is a schematic diagram showing an active/standby broker with Amazon EFS storage;

FIG. 14 is a schematic diagram showing details of the response (solver) preprocessor block of FIG. 11;

FIG. 15 is a schematic diagram showing details of the REST API in accordance with the embodiment of FIG. 11;

FIG. 16 is a schematic diagram showing how multiple domain-specific client computing entities can access the constraint scheduler via the common REST API;

FIG. 17 is a schematic diagram showing distance service being used by a VRP solver in accordance with certain embodiments; and FIG. 18 is a flow diagram showing the progression of a solver transaction in accordance with certain embodiments.

DETAILED DESCRIPTION

Various embodiments of the present disclosure are described more fully hereinafter with reference to the accompanying drawings, in which some, but not all embodiments of the disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present disclosure are described with reference to predictive data analysis, one of ordinary skill in the art will recognize that the disclosed concepts can be used to execute other types of data analysis. As used herein, the terms "data entity" and "data construct" may be used interchangeably.

I. GENERAL OVERVIEW AND TECHNICAL ADVANTAGES

Various embodiments of the present disclosure are generally directed to determining optimized solutions to input problems in a containerized, cloud-based (e.g., serverless) manner. Specifically, determining optimized solutions to input problems is based at least in part on execution of one or more container instances of one or more compute containers each corresponding to a solver type. The container instances are executed within a cloud-based multi-domain solver system in a serverless manner. That is, computing and processing resources may be recruited for execution of container instances on an on-demand basis. Accordingly, various embodiments of the present disclosure provide technical advantages by enabling flexible and elastic determination of optimized solutions for a volume of input problems. In various example instances, computing and processing resources may be diverted, allocated, reserved, and/or the like for particular input problems with priority, and computing and processing resources may be conserved when the volume of input problems is low. Thus, cloud-based and serverless determination of optimized solutions to input problems in various embodiments of the present disclosure result in efficient, flexible, and elastic use of computing and processing resources, which further translates to conservation of time and real-world costs.

In various embodiments, optimized solutions to input problems are determined based at least in part on execution of container instances, or instantiations of compute containers. A compute container may be understood as a containerization or package of computer executable instructions for determining an optimized solution for an input problem according to a particular solver type (e.g., a particular algorithm, a particular heuristic) and may include additional data necessary for determining an optimized solution (e.g., libraries, dependency data). Various embodiments of the present disclosure involve the use of compute containers for a variety or a set of solver types, and containerization of a variety of solver types provides various technical advantages. In particular, the use of compute containers enables flexibility and scalability, as multiple container instances of a compute container may execute substantially in parallel without excessive consumption of computing and processing resources. Further, different container instances of a compute container may execute to determine an optimized solution to different input problems, thereby enabling handling and processing of multiple input problems efficiently.

II. EXEMPLARY DEFINITIONS OF CERTAIN TERMS

The term "input problem" may refer to and describe a data construct that is configured to describe a defined problem provided to a cloud-based multi-domain solver system for solving. That is, an input problem may be accompanied or may embody a request for an optimized solution to the input problem. In various embodiments, the input problem is a constrained optimization problem, and the input problem may be solved by an optimized or optimal solution satisfying various defined constraints. The input problem may define various constraints and other problem features (e.g., problem type, assets to be optimized, per-asset parameters/properties/characteristics, optimization gain threshold(s), maximum execution iteration count(s)). Examples of input problems discussed herein and that are constrained optimization problems include the traveling salesman problem (seeking an optimized solution that is a path of minimal distance between a plurality of locations) and asset scheduling/distribution problems (seeking an optimized solution that is a schedule and/or distribution of assets to different locations and/or times). The input problem may be a polynomial problem, which can be solved by a polynomial-time algorithm, or a nondeterministic polynomial problem, which can be solved by checking correctness of various solutions in polynomial time.

The term "problem type" may refer to and describe a data construct that is configured to describe a classification of an input problem and may be determined by problem features of the input problem (e.g., from features supplied by an end user of a client computing entity). In various embodiments, the problem type of an input problem may be defined as a problem feature of the input problem. Generally, the problem type may describe the objective of the problem, examples of which including determining a path of minimal distance (a pathfinding problem type such as the traveling salesman problem) or determining a distribution of investments for maximal return (an asset distribution problem type such as an investment problem). In various instances then, the problem type may describe or characterize the solution required by the input problem. In various embodiments, the problem type of a problem may be described using embeddings, probabilities, one-hot encoding, associated or linked data objects, and/or the like.

The term "type-agnostic problem solving application programming interface (API) request" may refer to and describe a data construct that is configured to describe a communication between a client computing entity and a cloud-based multi-domain solver system requesting solving of an input problem. In various embodiments, the cloud-based multi-domain solver system comprises a type-agnostic problem API and receives a type-agnostic problem solving API request via the type-agnostic problem solving API and originating from a client computing entity. The type-agnostic problem solving API request may have a standardized configuration, such that each type-agnostic problem solving API request received by the cloud-based multi-domain solver system comprises various data fields in a particular configuration, each data field defining data of a particular meaning. In various embodiments, the type-agnostic problem solving API request may be defined as a data structure, data object, and/or the like, such as a vector, array, or matrix. The type-agnostic problem solving API request is type-agnostic in that input problems of any problem type may be defined using the type-agnostic problem solving API request. That is, the type-agnostic problem solving API request comprises various static data fields and various dynamic data fields that may be used to define an input problem of any problem type for solving by the cloud-based multi-domain solver system. In various embodiments, one or more dynamic data fields may be conditional or dependent on the problem type of the input problem. For example, one or more dynamic data fields may be used to define an input problem that is and/or is substantially similar to the traveling salesman problem, while the same dynamic data fields may be unused for another input problem that is and/or is substantially similar to an asset distribution problem. In some embodiments, the problem type of an input problem defined by a type-agnostic problem solving API request is described by a particular static data field of the type-agnostic problem solving API request. In various instances, multiple type-agnostic problem solving API requests may be received by a cloud-based multi-domain solver system, and the multiple type-agnostic problem solving API requests may each originate from different client computing entities in communication with the cloud-based multi-domain solver system. The multiple type-agnostic problem solving API requests may be received simultaneously and/or at substantially the same time.

The term "inbound problem queue" may refer to and describe a datastore, data construct, data structure, data object, matrix, array, vector, and/or the like identifying and/or describing a plurality of input problems to be solved by a cloud-based multi-domain solver system. In various instances, multiple type-agnostic problem solving API requests may be received by the cloud-based multi-domain solver system, and the inbound problem queue may organize the input problems described by the type-agnostic problem solving API requests. In various embodiments, the inbound problem queue may organize multiple input problems with different priorities, such that, for example, a particular input problem may be processed for solving before another input problem. In some embodiments, the inbound problem queue may organize various input problems based at least in part on a time that a corresponding type-agnostic problem solving API request was received by the cloud-based multi-domain solver system. The inbound problem queue may be configured, in some embodiments, to individually define each input problem to be solved (including various problem features). In other embodiments, the inbound problem queue may be configured to identify, link to, reference, and/or the like each input problem and/or associated type-agnostic problem solving API request.

The term "solver type" may refer to and describe a data construct that is configured to describe a type of an algorithm, heuristic, method, and/or the like for solving a problem, or for determining a solution for a problem, where the type may be determined based at least in part on a problem type of a corresponding problem. It may be appreciated that a solution for an input problem may be determined using multiple different solver types, each providing a solution with different accuracies and with different efficiencies. Referring to a traveling salesman input problem as an illustrative example, a solution may be determined using a brute-force solver type, a first-fit solver type, a strongest-fit solver type, a Tabu-search solver type, a simulated-annealing solver type, a late-acceptance solver type, a hill-climbing solver type, a strategic oscillation solver type, and/or the like. For polynomial problems, various solver types may describe algorithms, heuristics, methods, and/or the like for solving an input problem, or determining an exact solution for a problem. For nondeterministic polynomial problems, various solver types may describe algorithms, heuristics, methods, and/or the like for both determining a proposed solution to the input problem and for determining a "correctness" or accuracy of the proposed solution for the input problem.

The term "solver domain" may refer to and describe a data construct that is configured to describe a common characteristic of a set of solver types. For example, in some embodiments, a solver type may be "truck scheduling" and a solver domain may be "scheduling." In some embodiments, a solver domain may be associated with a set of per-domain solver types based at least in part on optimized solutions determined by each of the per-domain solver types. The optimized solutions determined by each of the per-domain solver types are similar in form and are applicable to solving input problems for a problem type. Thus, a problem type may be mapped to a solver domain to identify a set of per-domain solver types that may be used to solve input problems of the problem type. As an example, a solver domain may be associated with a set of per-domain solver types that each are directed to finding an optimized path.

The term "compute container" may refer to and describe a data construct that is configured to describe an instantiable package, bundle, image, and/or the like of computer executable instructions. According to various embodiments, a compute container comprises computer executable instructions for a particular solver type to determine solutions to an input problem. That is, a compute container corresponding to a solver type may electronically embody and/or implement the solver type. A compute container may additionally include various libraries, dependency data, and/or the like required to embody and/or implement the solver type. A compute container may comprise a constraint mapper configured to identify problem constraints and ensure determined solutions satisfy problem constraints of the input problem during optimization. Compute containers may be instantiated within a cloud-based multi-domain solver system as container instances that individually consume computing and processing resources on an on-demand basis. Compute containers may be defined using various systems, methods, architectures, and/or the like, such as Docker for example.

The term "container instance" may refer to and describe a data construct that is configured to describe an instantiation of a compute container, involving execution of computer executable instructions defined by the compute container. Multiple container instances for a compute container may execute substantially in parallel; that is, a compute container may be instantiated more than once. A container instance may execute within a cloud-based multi-domain solver system and thus use computing and processing resources on an on-demand basis. The cloud-based multi-domain solver system may include container instances of different compute containers corresponding to different solver types for determining solutions to different problems in parallel and/or substantially at the same time. In various embodiments, various container instances of a compute container may be used to determine solutions for different input problems. For example, for a compute container of a simulated-annealing solver type, a first container instance may be executing to determine a solution to a first traveling salesman input problem, while a second container instance may be executing to determine a solution to a second traveling salesman input problem. Thus, it will be appreciated that containerization of different solver types as compute containers that may be instantiated multiple times as different container instances provides various technical advantages, as solutions to multiple input problems may be determined in parallel by multiple container instances and/or multiple competing solutions to one input problem may be determined in parallel by multiple container instances. A count of container instances of a compute container may be scaled up and/or down, which also provides technical advantages in improved management and usage of computing and processing resources within a cloud-based multi-domain solver system.

Execution of a container instance may involve using various problem features (e.g., parameters, values, constraints) of an input problem to determine a solution to the input problem, and such problem features may be retrieved, received, and/or the like from the inbound problem queue, a type-agnostic problem solving API request defining the input problem, and/or a storage subsystem of the cloud-based multi-domain solver system. Execution of a container instance may occur over multiple execution iterations to iteratively determine and improve a solution to an input problem per the solver type of the compute container associated with the container instance. For example, for various solver types, a compute container may use a previously determined solution from a previous execution iteration in determining a subsequent solution in a subsequent execution iteration.

The term "per-iteration optimization gain" may refer to and describe a data construct that is configured to describe a measure of the convergence or approach toward correctness of solutions determined by a container instance of a compute container corresponding to a solver type. As discussed, container instances of compute containers corresponding to certain solver types execute to iteratively determine solutions to an input problem, and a per-iteration optimization gain may describe and/or may be a value describing the difference between a first solution determined during a first execution iteration and a second solution determined during a second (and subsequent) execution iteration. In various instances, such as with nondeterministic polynomial problems, per-iteration optimization gain may describe an improvement (or deterioration) of the correctness of the second solution compared to the first solution. In various embodiments, the per-iteration optimization gain during execution of a container instance is compared to a configurable gain threshold, and the execution of the container instance is halted or cancelled if the per-iteration optimization gain does not satisfy the configurable gain threshold. For example, if the difference between two consecutive solutions determined by a container instance is small and less than a configurable gain threshold, then it may be determined that the solutions determined by the container instance has converged. In such an example, the execution of the container instance may be halted, and the last solution determined by the container instance may be provided as a container output. Likewise, if the difference between two consecutive solutions determined by a container instance is increasing and greater than a configurable gain threshold, then it may be determined that the solutions determined by the container instance are diverging. In such an instance, the execution of the container instance may be halted and/or terminated, and computing and processing resources may be diverted to other container instances, in various embodiments. In various embodiments, the configurable gain threshold may be defined as a property or parameter of a solver type, a property or parameter of a compute container corresponding to a solver type, and/or a property or parameter of a container instance of a compute container. The configurable gain threshold may additionally or alternatively be defined as a problem feature of the input feature.

The term "serverless container management engine" may refer to a data entity configured to manage the execution of container instances of compute containers each corresponding to a solver type within a cloud-based multi-domain solver system. In doing so, the serverless container management engine may monitor execution of a container instance. In various embodiments, the serverless container management engine is configured to determine a per-iteration optimization gain of a solution determined by a container instance at each execution iteration and is configured to halt and/or terminate execution of the container instance based at least in part on comparing the per-iteration optimization gain with one or more configurable gain thresholds. In general, the serverless container management engine is configured to scale (up or down) a count of container instances based at least in part on a variety of factors (including the previously mentioned per-iteration optimization gains). For example, the serverless container management engine may reduce the count of container instances presently and concurrently executing within the cloud-based multi-domain solver system (e.g., by halting and/or terminating some container instances) based at least in part on availability of computing and processing resources within the cloud-based multi-domain solver system, present request demand (e.g., a count of problems identified by the inbound problem queue), divergence of multiple solutions for a particular input problem, and/or the like. Likewise, the serverless container management engine may increase the count of container instances presently and concurrently executing within the cloud-based multi-domain solver system for similar reasons. In various embodiments, the serverless container management engine is configured to generate a new container instance of a compute container, and in doing so, may be configured to access data for a compute container. In general then, the serverless container management engine may be configured to allocate, assign, distributed, and/or the like computing and processing resources to various container instances. Example serverless container management engines that may be used in accordance with various embodiments of the present disclosure include (but are not limited to) Amazon Web Services (AWS) Fargate and Kubernetes.

The term "computing and processing resources" may generally refer to and describe the computing and processing components, such as one or more processors, memories, network interfaces, and/or the like, and portions thereof for processing and execution of computer executable instructions. For example, a processor, memory, and network interface of a cloud computing server computing entity may be computing and processing resources for executing a container instance. Usage and utilization of computing and processing resources may be measured, monitored, allocated, distributed, and/or the like for various computer executable instructions (e.g., container instances). In examples where the processor is a central processing unit (CPU), CPU time may be divided and distributed among different container instances. Likewise, resource utilization or usage may include an amount of memory reserved or used by a container instance, and monitoring such resource utilization or usage may comprise locating potential memory leaks.

The term "outbound solution queue" may refer to and describe a datastore, data construct, data structure, data object, matrix, array, vector, and/or the like identifying, describing, and/or storing a plurality of problem outputs corresponding to a plurality of input problems. Each problem output of the outbound solution queue may correspond to an input problem of the inbound problem queue and may comprise a solution to the corresponding input problem. In various embodiments, an input problem may be removed from the inbound problem queue responsive to the addition of a corresponding problem output to the outbound solution queue, thereby indicating that the input problem has been handled. The outbound solution queue may organize the plurality of problem outputs based at least in part on the organization of input problems of the inbound problem queue and/or a time at which the problem output was generated. In various embodiments, each problem output of the outbound solution queue is associated and/or identified a particular client computing entity to which the problem output should be transmitted.

The term "type-agnostic problem solution API response" may refer to and describe a data construct that is configured to describe communication between a cloud-based multi-domain solver system and a client computing entity. Specifically a type-agnostic problem solution API response may be responsive to a type-agnostic problem solving API request received by the cloud-based multi-domain solver system and originated from the client computing entity. The type-agnostic problem solution API response may include a problem output comprising a solution to an input problem defined by the type-agnostic problem solving API request. Multiple type-agnostic problem solution API responses may be transmitted by the cloud-based multi-domain solver system according to the outbound solution queue. For example, type-agnostic problem solution API responses may be sequentially transmitted according to the organization of problem outputs within the outbound solution queue. In various instances, the type-agnostic problem solution API response may be asynchronous. As solutions to different problems may require different amounts of time, a first time period between receiving a first type-agnostic problem solving API request and transmitting a first type-agnostic problem solution API response may be different from a second time period between receiving a second type-agnostic problem solving API request and transmitting a second type-agnostic problem solution API response.

The term "serverless request management engine" may refer to and describe a data entity configured to manage the receipt of type-agnostic problem solving API requests and the transmission of type-agnostic problem solution API responses within a cloud-based multi-domain solver system. A serverless request management engine may be serverless in that the receiving and processing of type-agnostic problem solving API requests and the transmission of type-agnostic problem solution API responses may consume a dynamic or variable amount of computing and processing resources. Multiple type-agnostic problem solving API requests may be received simultaneously and/or within a period of time at the serverless request management engine, and the serverless request management engine may communicate with the inbound problem queue for handling of (e.g., determining solutions to) input problems defined by the multiple type-agnostic problem solving API requests. Meanwhile, the serverless request management engine is configured to communicate with the outbound solution queue to retrieve problem solutions corresponding to input problems defined by the multiple type-agnostic problem solving API requests. The serverless request management engine may generate and transmit multiple type-agnostic problem solution API responses to the multiple type-agnostic problem solving API request that include problem outputs from the outbound solution queue. In various embodiments, a cloud-based multi-domain solver system comprises one or more serverless request management engines each corresponding to an availability zone and configured to handle communications with a particular cohort of client computing entities, communications within a particular period of time, communications with client computing entities located in a particular area, and/or the like. Use of one or more serverless request management engines advantageously allows efficient handling of communications (e.g., receiving type-agnostic problem solving API requests, transmitting type-agnostic problem solution API responses) among a large population of client computing entities with minimal delay.

III. COMPUTER PROGRAM PRODUCTS, METHODS, AND COMPUTING ENTITIES

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises a combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Embodiments of the present disclosure may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware framework and/or operating system platform. A software component comprising assembly language instructions may require conversion into executable machine code by an assembler prior to execution by the hardware framework and/or platform. Another example programming language may be a higher-level programming language that may be portable across multiple frameworks. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage median include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatuses, systems, computing devices, computing entities, and/or the like. As such, embodiments of the present disclosure may take the form of an apparatus, system, computing device, computing entity, and/or the like executing instructions stored on a computer-readable storage medium to execute certain steps or operations. Thus, embodiments of the present disclosure may also take the form of an entirely hardware embodiment, an entirely computer program product embodiment, and/or an embodiment that comprises combination of computer program products and hardware executing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatuses, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be executed sequentially such that one instruction is retrieved, loaded, and executed at a time. In some exemplary embodiments, retrieval, loading, and/or execution may be executed in parallel such that multiple instructions are retrieved, loaded, and/or executed together. Thus, such embodiments can produce specifically-configured machines executing the steps or operations specified in the block diagrams and flowchart illustrations. Accordingly, the block diagrams and flowchart illustrations support various combinations of embodiments for executing the specified instructions, operations, or steps.

IV. EXEMPLARY SYSTEM FRAMEWORK

FIG. 1 is a schematic diagram of an example architecture 100 for determining optimized solutions to input problems in a containerized, cloud-based (e.g., serverless) manner. The architecture 100 includes a cloud-based multi-domain solver system 101 configured to receive type-agnostic problem solving API requests, manage execution of container instances of compute containers corresponding to solver types that determine solutions to input problems defined by the type-agnostic problem solving API requests, and provide problem outputs comprising optimized solutions to input problems via type-agnostic solution API responses. In various embodiments, the cloud-based multi-domain solver system 101 scales a count of container instances undergoing execution based at least in part on various factors, including availability of computing and processing resources and a number of type-agnostic problem solving API requests received. For example, the cloud-based multi-domain solver system 101 may assign, increase, allocate, and/or the like computing and processing resources to a container instance in execution and/or may restrict, reduce, cut off, and/or the like computing and processing resources to a container instance in execution.

In various embodiments, the cloud-based multi-domain solver system 101 communicates with a plurality of client computing entities 102 using one or more communication networks. Examples of communication networks include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, and/or the like). The cloud-based multi-domain solver system 101 may receive type-agnostic problem solving API requests originating from various client computing entities 102 via such communication networks and may further transmit type-agnostic problem solution API responses to various client computing entities 102 via such communication networks.

The cloud-based multi-domain solver system 101 may include a cloud computing server computing entity 106 and a storage subsystem 108. The cloud computing server computing entity 106 may be configured for serverless execution of container instances for determining solutions to input problems. That is, execution of a container instance may be accomplished using a variable amount of computing and processing resources of the cloud computing server computing entity 106. In this regard, the cloud computing server computing entity 106 may be understood as an abstraction of one or more individual computing entities sharing computing and processing resources. The cloud computing server computing entity 106 may be configured to receive and process type-agnostic problem solving API requests defining input problems. In various embodiments, the cloud computing server computing entity 106 generates and terminates container instances (e.g., by supplying and/or by removing computing and processing resources from container instances), generate problem outputs based at least in part on container outputs from the container instances, and provide the problem outputs via type-agnostic problem solution API responses.

The storage subsystem 108 may be configured to store data used by the cloud computing server computing entity 106 to determine optimized solutions to input problems in a containerized, cloud-based manner. For example, the storage subsystem 108 is configured to store compute containers each corresponding to a solver type and configured to be instantiated and executed as container instances. The storage subsystem 108 may be further configured to store an inbound problem queue and an outbound solution queue for scheduling and communication management. The storage subsystem 108 may include one or more storage units, such as multiple distributed storage units that are connected through a computer network (e.g., an internal communication network of the cloud-based multi-domain solver system 101). Each storage unit in the storage subsystem 108 may store at least one of one or more data assets and/or one or more data about the computed properties of one or more data assets. Moreover, each storage unit in the storage subsystem 108 may include one or more non-volatile storage or memory media including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

Exemplary Cloud Computing Server Computing Entity

FIG. 2 provides a schematic of a cloud computing server computing entity 106 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to execute the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be executed on data, content, information, and/or similar terms used herein interchangeably.

As indicated, in one embodiment, the cloud computing server computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. The cloud computing server computing entity 106 may communicate with a plurality of client computing entities 102 via the one or more communications interfaces 220, such as to receive type-agnostic problem solving API requests and to transmit type-agnostic problem solution API responses.

As shown in FIG. 2, in one embodiment, a cloud computing server computing entity 106 may include, or be in communication with, one or more processing elements 205 (also referred to as processors, processing circuitry, and/or similar terms used herein interchangeably) that communicate with other elements within the cloud computing server computing entity 106 via a bus, for example. As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of executing steps or operations according to embodiments of the present disclosure when configured accordingly.

In one embodiment, the cloud computing server computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the cloud computing server computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the cloud computing server computing entity 106 with the assistance of the processing element 205 and operating system.

As indicated, in one embodiment, the cloud computing server computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the cloud computing server computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the cloud computing server computing entity 106 may include, or be in communication with, one or more input elements, such as a keyboard input, a mouse input, a touch screen/display input, motion input, movement input, audio input, pointing device input, joystick input, keypad input, and/or the like. The cloud computing server computing entity 106 may also include, or be in communication with, one or more output elements (not shown), such as audio output, video output, screen/display output, motion output, movement output, and/or the like.

Exemplary Client Computing Entity

FIG. 3 provides an illustrative schematic representative of a client computing entity 102 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Client computing entities 102 can be operated by various parties. As shown in FIG. 3, the client computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the client computing entity 102 may be capable of operating with one or more air interface standards, communication protocols, modulation types, and access types. More particularly, the client computing entity 102 may operate in accordance with any of a number of wireless communication standards and protocols, such as those described above with regard to the cloud computing server computing entity 106. In a particular embodiment, the client computing entity 102 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the client computing entity 102 may operate in accordance with multiple wired communication standards and protocols, such as those described above with regard to the cloud computing server computing entity 106 via a network interface 320.

Via these communication standards and protocols, the client computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 102 can also download changes, add-ons, and updates, for instance, to its firmware, software (e.g., including executable instructions, applications, program modules), and operating system.

According to one embodiment, the client computing entity 102 may include location determining aspects, devices, modules, functionalities, and/or similar words used herein interchangeably. For example, the client computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the client computing entity's 102 position in connection with a variety of other systems, including cellular towers, Wi-Fi access points, and/or the like. Similarly, the client computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The client computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the client computing entity 102 to interact with and/or cause display of information/data from the cloud computing server computing entity 106, as described herein. The user input interface can comprise any of a number of devices or interfaces allowing the client computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the client computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The client computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the client computing entity 102. As indicated, this may include a user application that is resident on the entity or accessible through a browser or other user interface for communicating with the cloud computing server computing entity 106 and/or various other computing entities.

In another embodiment, the client computing entity 102 may include one or more components or functionality that are the same or similar to those of the cloud computing server computing entity 106, as described in greater detail above. As will be recognized, these architectures and descriptions are provided for exemplary purposes only and are not limiting to the various embodiments.

In various embodiments, the client computing entity 102 may be embodied as an artificial intelligence (AI) computing entity, such as an Amazon Echo, Amazon Echo Dot, Amazon Show, Google Home, and/or the like. Accordingly, the client computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

V. EXEMPLARY SYSTEM OPERATIONS

As described below, various embodiments of the present disclosure describe techniques for determining optimized solutions to input problems based at least in part on serverless execution of one or more container instances of one or more compute containers each corresponding to a solver type. For example, various embodiments of the present disclosure provide techniques for generating and managing one or more container instances to generate a problem output. The noted techniques involve the efficient use of computing and processing resources, which may be dynamically allocated to different container instances based at least in part on various factors (e.g., availability of resources, total volume of input problems, execution progression, solution optimization gain). This in turn reduces the overall operational load on a cloud-based multi-domain solver system in accordance with various embodiments and increases operational efficiency and operational reliability of the same.

FIG. 4 provides a flowchart diagram of an example process 400 for determining an optimized solution to an input problem in a containerized, cloud-based (e.g., serverless) manner. In various embodiments, the cloud computing server computing entity 106 comprises means, such as one or more processing elements 205, one or more memories 210, 215, a network interface, and/or the like, for performing the steps/operations of process 400.

As illustrated, process 400 comprises step/operation 401. In one embodiment, process 400 begins with and/or is triggered by step/operation 401. Step/operation 401 comprises receiving a problem type of an input problem originating from a client computing entity 102. In various embodiments, the problem type of an input problem may be received via a type-agnostic problem solving API request. In various embodiments, the cloud-based multi-domain solver system 101 comprises a type-agnostic problem solving API and receives a type-agnostic problem solving API request via the type-agnostic problem solving API and originating from the client computing entity 102.

In various embodiments, the type-agnostic problem solving API request indicates the problem type of the input problem, as well as other problem features of the input problem. The type-agnostic problem solving API request may have a standardized configuration, such that each type-agnostic problem solving API request received by the cloud-based multi-domain solver system comprises various data fields in a particular configuration, each data field defining data of a particular meaning. In various embodiments, the type-agnostic problem solving API request may be defined as a data structure, data object, and/or the like, such as a vector, array, or matrix. The type-agnostic problem solving API request is type-agnostic in that input problems of any problem type may be defined using the type-agnostic problem solving API request. That is, the type-agnostic problem solving API request may comprise various static data fields and various dynamic data fields that may be used to define an input problem of any problem type for solving by the cloud-based multi-domain solver system. In various embodiments, one or more dynamic data fields may be conditional or dependent on the problem type of the input problem. For example, one or more dynamic data fields may be used to define an input problem that is and/or is substantially similar to the traveling salesman problem, while the same dynamic data fields may be unused for another input problem that is and/or is substantially similar to an asset distribution problem. In some embodiments, the problem type of an input problem defined by a type-agnostic problem solving API request is described by a particular static data field of the type-agnostic problem solving API request.

In various embodiments, the cloud-based multi-domain solver system 101 comprises a request management engine in communication with and/or comprising the type-agnostic problem API. FIG. 5A illustrates an example block diagram of a cloud computing server computing entity 106 comprising a request management engine 502. The request management engine 502 is configured to receive, process, handle, and/or the like type-agnostic problem solving API requests originating from various client computing entities 102. In various embodiments, the request management engine 502 receives a type-agnostic problem solving API request via the type-agnostic problem API and validates the type-agnostic problem solving API request. The request management engine 502 may further extract problem features of the input problem defined by the type-agnostic problem solving API request and for example, identifies the problem type of the input problem defined by the type-agnostic problem solving API request.

In various embodiments, the cloud computing server computing entity 106 comprises one or more request management engines 502, each configured to receive and process type-agnostic problem solving API requests originating from various client computing entities 102, such as is illustrated in FIG. 5B. In such embodiments, each request management engine 502 may correspond to an availability zone 510A-B. An availability zone 510A-B describes a range of responsibility of a corresponding request management engine 502. For example, a first request management engine 502A corresponding to a first availability zone 510A may be configured to receive and process type-agnostic problem solving API requests originating from a first cohort of client computing entities 102, while a second request management engine 502B corresponding to a second availability zone 510B may be configured to receive and process type-agnostic problem solving API requests originating from a second cohort of client computing entities 102. As another example, use of request management engines 502 of different availability zones 510A-B may be based at least in part on demand, wherein the second request management engine 502B corresponding to the second availability zone 510B is configured to receive and process type-agnostic problem solving API requests when the first request management engine 502A corresponding to the first availability zone 510A is consuming a threshold amount of computing and processing resources when receiving and processing type-agnostic problem solving API requests. Accordingly, the use of more than one request management engine 502 and the division of the same among different availability zones 510A-B advantageously provides efficient and flexible use of computing and processing resources.

In various embodiments, the request management engine(s) 502 communicates with an inbound problem queue 506. The inbound problem queue 506 is configured to identify and/or describe a plurality of input problems to be solved by the cloud-based multi-domain solver system 101. In various instances, multiple type-agnostic problem solving API requests may be received by the request management engine 502, and the request management engine 502 may cause the multiple input problems defined by the multiple type-agnostic problem solving API requests to be identified and/or described by the inbound problem queue 506. In various embodiments, input problems may be organized within the inbound problem queue 506, such as in a first-in-first-out (FIFO) manner.

Step/operation 402 comprises mapping the problem type of the input problem to one or more selected solver types. As previously discussed, the problem type of the input problem describes a classification of an input problem and may be determined by problem features of the input problem. Generally, the problem type may describe the objective of the problem, examples of which including determining a path of minimal distance (a pathfinding problem type such as the traveling salesman problem) or determining a distribution of investments for maximal return (an asset distribution problem type such as an investment problem). In various instances then, the problem type may describe or characterize the solution required by the input problem.

While the problem type may describe or characterize the solution required by the input problem, a solver type describes an algorithm, heuristic, method, and/or the like for determining a solution for a problem. In various embodiments, the cloud computing server computing entity 106 hosts, stores, has access to, and/or the like to a variety of solver types that each determine various solutions for various problems. The variety of solver types may be identified by a library or database of solver types that identify each solver type and may describe inputs, outputs, required parameters, computational or algorithmic complexity, and/or the like of each solver type. The variety of solver types may include solver types that are best applied or are only able to be applied to certain problems, and thus, the cloud computing server computing entity 106 maps the problem type to one or more selected solver types.

In particular, in some embodiments, mapping the problem type to one or more selected solver types is embodied in the example steps/operations illustrated in FIG. 6. That is, FIG. 6 provides a flowchart illustrates an example process that is an example embodiment of step/operation 402. In various embodiments, the cloud computing server computing entity 106 comprises means, such as one or more processing elements 205, one or more memories 210, 215, a network interface, and/or the like, for performing the steps/operations of process 600.

At step/operation 601 of process 600, a solver domain is determined based at least in part on the problem type of the input problem and one or more problem features of the input problem. A solver domain describes a common characteristic of a set of solver types. Specifically, a solver domain may be associated with a set of per-domain solver types based at least in part on optimized solutions determined by each of the per-domain solver types. The optimized solutions determined by each of the per-domain solver types are similar in form and are applicable to solving input problems for a problem type. Thus, a solver domain is determined to identify a set of per-domain solver types that may be used to solve input problems of the problem type and applied to the input problem. As an example, a solver domain may be associated with a set of per-domain solver types that each are directed to finding an optimized path.

Accordingly, step/operation 602 comprises identifying a set of per-domain solver types corresponding to the solver domain. In various embodiments, each per-domain solver type is associated with a unique identifier, and the solver domain is generated to comprise various identifiers for the per-domain solver types. As an example, a solver domain identifying per-domain solver types that may be applied to an input problem of the pathfinding problem type may comprise an identifier for the brute-force solver type, an identifier for the simulated-annealing solver type, an identifier for the Dijkstra solver type, and identifier for the hill-climbing solver type, and/or the like.

At step/operation 603, one or more selected solver types are then determined from the set of per-domain solver types. The one or more selected solver types may be per-domain solver types with relatively better performance metrics, resource usage requirements, and/or the like compared to other per-domain solver types. As an example, the one or more selected solver types are determined based at least in part on having low resource usage requirements (e.g., linear or lower-order computational complexity) compared to a resource usage threshold. The resource usage threshold may be determined based at least in part on the volume of input problems in the inbound problem queue 506, and thus, selected solver types may be determined based at least in part on the volume of input problems requiring solutions. Thus, with at least these steps/operations, the problem type of the input problem may be mapped to one or more selected solver types. In various embodiments, the mapping between the input problem and the one or more selected solver types is stored and used for training and configuring a solver selection machine learning model. The solver selection machine learning (ML) model is configured (e.g., trained) to intelligently and automatically determine selected solver types for an input problem. In certain exemplary embodiments described below, the ML-based solver type selection is performed by a solver preprocessor.

In various embodiments, the inbound problem queue 506 is configured to identify and describe the selected solver types subsequent to determining the selected solver types. For example, within the inbound problem queue 506, an input problem may be associated with the one or more selected solver types determined to map to the problem type of the input problem. Accordingly, the inbound problem queue 506 in various embodiments advantageously stores comprehensive and complete information for each input problem. Using the inbound problem queue 506, the selected solver types mapped to an input problem may be quickly identified, precluding a need to search and/or retrieve the selected solver types from other memory storage areas. This is further advantageous in quickly and efficiently determining an estimated amount of computing and processing resources required for handling a particular input problem by rapidly identifying the selected solver types mapped to the particular input problem which may each be associated with some indication of resource requirements.

Returning to FIG. 4, step/operation 403 comprises generating one or more container instances of one or more compute containers, each compute container corresponding to a selected solver type. A compute container describes an instantiable package, bundle, image, and/or the like of computer executable instructions and/or additional data required for executing the computer executable instructions (e.g., datasets, data libraries, dependency data). A compute container is advantageously lightweight at least with regards to memory storage due to the compute container not requiring standard and repetitive data (e.g., an operating system). A compute container is further advantageous in being stand-alone and not requiring data retrieval and communication with other data modules, data libraries, data engines, and/or the like, as all required data for the instantiation and execution of the compute container is packaged within the compute container.

In various embodiments, a compute container is configured to determine solutions to an input problem according to a solver type (e.g., an algorithm, heuristic, method). That is, a compute container corresponding to a solver type may electronically embody and/or implement the solver type. For example, a first compute container corresponding to the brute-force solver type is configured to, when instantiated and executed, generate and test all possible solutions to an input problem to determine an optimized solution, while a second compute container corresponding to the Tabu-search solver type is configured to, when instantiated and executed, test similar solutions to a particular solution and evaluate improvements in optimization of the similar solutions in order to determine an optimized solution. With each compute container corresponding to a solver type, a compute container may be uniquely identified (e.g., via various global or universal identifiers) and may be stored with other compute containers in a datastore, a dataset, a data library, and/or the like. A compute container may also define a constraint mapper configured to identify problem constraints of the input problem and ensure that determined solutions satisfy various problem constraints during optimization.

Compute containers are instantiated within the cloud-based multi-domain solver system 101 as container instances that individually consume computing and processing resources on an on-demand basis. That is, a container instance is defined as an instantiation of a compute container. Upon generation of a container instance, the container instance may be configured to begin execution automatically and in a standalone manner. Execution of a container instance consumes some amount of computing and processing resources, and such resources may be appropriately allocated and distributed between one or more container instances. A minimum amount of computing and processing resources required to execute a container instance of a particular compute container may be a defined and described parameter of the particular compute container, in various embodiments, and a container instance may be generated when at least the minimum amount of computing and processing resources required for execution is available.

Generation and execution of container instances may be managed by one or more container management engines 504 of the cloud computing server computing entity 106, illustrated in FIG. 5A and FIG. 5B. In various embodiments, a container management engine 504 is configured to generate a container instance of a compute container and dynamically allocate an amount of computing and processing resources to execution of the container instance. As part of dynamic allocation of computing and processing resources among one or more container instances, a container management engine 504 is configured to monitor usage and distribution of the computing and processing resources of the cloud computing server computing entity 106 and re-distribute such resources among the container instances when deemed necessary. Similarly, a container management engine 504 is configured to monitor an available amount of computing and processing resources and generate a container instance if the available amount of computing and processing resources satisfies the minimum amount of computing and processing resources required for execution of the container instance. In various embodiments, a container management engine 504 also does not allocate an excess amount of computing and processing resources to a container instance, and the amount of computing and processing resources allocated to a container instance may be limited by one or more configurable thresholds or limits. Various further variations of container instantiation will come to mind of one skilled in the field to which the present disclosure pertains. For instance, container instances for the one or more compute containers are generated dynamically over time. In an example with an input problem mapped to five solver types, container instances for two solver types may be generated first (e.g., due to limited availability of computing and processing resources) with container instances for the remaining three solver types being generated at a subsequent timepoint.

As shown in FIG. 5B, the cloud computing server computing entity 106 may comprise one or more container management engines 504 each corresponding to an availability zone 510 and each configured to manage the generation and execution of container instances for input problems received in the corresponding availability zone 510. Further, computing and processing resources of the cloud computing server computing entity 106 may be divided or partitioned between multiple availability zones 510, and a container management engine 504 is configured to allocate computing and processing resources for a corresponding availability zone 510 to the generation and execution of container instances. In the illustrated embodiment, the cloud computing server computing entity 106 comprises a first container management engine 504A corresponding to a first availability zone 510A and a second container management engine 504B corresponding to a second availability zone 510B.

The one or more container instances are generated (e.g., via a container management engine 504) based at least in part on the inbound problem queue 506. Specifically, the inbound problem queue 506 may indicate that a particular input problem is ready to be handled and may communicate with a container management engine 504 to generate container instances for one or more compute containers each corresponding to a selected solver type mapped to the particular input problem. In some embodiments, each input problem identified by the inbound problem queue 506 is associated with a status, one such status being a "ready" status. In communicating with the inbound problem queue 506, a container management engine 504 may receive or retrieve problem features for the input problem, including various parameters, values, and data relevant to the input problem, and may provide such problem features to a container instance upon generation. Accordingly, the container instance, once generated, is equipped to determine an optimized solution to the input problem.

As previously described, a container instance may be configured to automatically begin execution upon generation and may be provided with problem features necessary for determining optimized solutions for a particular input problem. In various embodiments, a container instance comprises a heartbeat API that is used to indicate that an optimized solution for an input problem is presently being determined using the container instance (e.g., the container instance is "alive"). In various embodiments, a container instance communicates with a container management engine 504 and/or the inbound problem queue 506 via the heartbeat API, informing the container management engine 504 and/or the inbound problem queue 506 that the container instance is "alive" and executing. During the execution of at least one container instance for a particular input problem, the status associated with the particular input problem at the inbound problem queue 506 may be configured to a "processing", "handling", and/or the like status.

Thus, with step/operation 403, one or more container instances are generated, each executing to determine an optimized solution to the input problem. At step/operation 404, a problem output is then generated using the one or more container instances. The problem output may comprise an optimized solution generated based at least in part on execution of the one or more container instances.

In some embodiments, by using container instances to determine optimized solutions, various embodiments of the present disclosure are generally directed to determining optimized solutions to input problems in a containerized, cloud-based (e.g., serverless) manner. Specifically, determining optimized solutions to input problems is based at least in part on execution of one or more container instances of one or more compute containers each corresponding to a solver type. The container instances are executed within a cloud-based multi-domain solver system in a serverless manner. That is, computing and processing resources may be recruited for execution of container instances on an on-demand basis. Accordingly, various embodiments of the present disclosure provide technical advantages by enabling flexible and elastic determination of optimized solutions for a volume of input problems. In various example instances, computing and processing resources may be diverted, allocated, reserved, and/or the like for particular input problems with priority, and computing and processing resources may be conserved when the volume of input problems is low. Thus, cloud-based and serverless determination of optimized solutions to input problems in various embodiments of the present disclosure result in efficient, flexible, and elastic use of computing and processing resources, which further translates to conservation of time and real-world costs.

In some embodiments, generation of the problem output is embodied by the steps/operations illustrated in FIG. 7. FIG. 7 illustrates an example embodiment for generating a problem output (e.g., step/operation 404).

At step/operation 701, the execution of each container instance is monitored for each execution iteration. Execution of container instances associated with various solver types is performed over multiple execution iterations that may be interdependent. At each execution iteration, a container instance may determine a proposed solution, and each proposed solution may be based at least in part on a previously determined solution from a previous execution iteration. Also at each execution iteration, a container instance may determine a per-iteration optimization gain as a measure of convergence or approach to optimization. A per-iteration optimization gain compares a determined solution with a previously determined solution (e.g., the most recent solution). In some embodiments, the container instance is configured to output the per-iteration optimization gain as an indication of the container instance's progress towards optimization of a solution. For example, the per-iteration optimization gain may be provided via the heartbeat API of the container instance. Thus, the cloud computing server computing entity 106 (e.g., via a container management engine 504 may monitor the execution of a container instance and progress thereof).

In various embodiments, monitoring the execution of a container instance comprises monitoring the amount of computing and processing resources allocated to the container instance and/or consumed by the container instance. In monitoring resource usage and utilization of a container instance, usage data associated with multiple timepoint may be collected and analyzed. In various embodiments, usage data comprises dedicated processing time (e.g., a fraction of total time spent by one or more processors to process the container instance), memory size (e.g., amount of memory storage, volatile and/or non-volatile, reserved and used by the container instance), and/or the like.

Step/operation 702 comprises halting execution of a container instance if a per-iteration optimization gain of the execution iteration fails to satisfy a configurable per-iteration optimization gain threshold. As previously describe, the per-iteration optimization gain of an execution iteration indicates the progress towards optimization of a container instance. In some instances, solutions determined by a container instance may diverge, resulting in unsatisfactory per-iteration optimization gains. It may be understood that divergence of solutions typically suggests that an optimized solution cannot be determined (e.g., reconvergence is unlikely) and thus to avoid waste of computing and processing resources for the container instance, execution of the container instance may be halted. Various configurable per-iteration optimization gain thresholds may be further based at least in part on resource usage and utilization of the container instance. For example, a container instance may be halted when per-iteration optimization gains do not change or improve while resource usage and utilization increases.

In some embodiments, halting of execution of a container instance is caused via the heartbeat API of the container instance. For example, the container instance may receive a halt, kill, terminate, and/or the like command originating from a container management engine 504 via the heartbeat API. In some embodiments, a container instance is configured to automatically halt execution responsive to one or more unsatisfactory per-iteration optimization gains and may transmit a final heartbeat message indicating halting of execution via the heartbeat API. In various embodiments, a container instance may be halted, paused, killed, terminated, and/or the like by limiting or stopping computing and processing resources from being allocated for the container instance. Computing and processing resources may be actively deallocated (e.g., by a container management engine 504) from the container instance to other container instances.

Step/operation 703 comprises receiving one or more container outputs generated based at least in part on execution of the one or more container instances. Container instances provide container outputs when execution is complete, which may also be determined using per-iteration optimization gains. For example, per-iteration optimization gains may be evaluated to determine whether progress towards optimization is sufficiently complete. Additionally or alternatively, solutions may be tested for absolute correctness for input problems of some problem types. In any regard, a container output provided by a container instance may comprise an optimized solution for the input problem. A container output may further comprise convergence data (e.g., per-iteration optimization gains for each execution iteration), iteration data (e.g., number of execution iterations performed), and/or the like.

Step/operation 704 comprises generating the problem output based at least in part on the one or more container outputs. In various instances, the input problem is mapped to multiple solver types, and multiple container outputs may be received from multiple container instances. Accordingly, the multiple container outputs may be aggregated and compared to generate a problem output. For example, the problem output may comprise an optimized solution of best fit from the multiple optimized solutions of the multiple container outputs. As an alternative example, the problem output may comprise an averaged solution of the multiple optimized solutions of the multiple container outputs. In various embodiments, the problem output comprises additional data, such as performance metrics of the multiple solver types mapped to the input problem. That is the problem output may describe if any container instances of a solver type were halted, an average number of execution iterations performed by container instances of a solver type, and/or the like. Such performance metrics of each solver type may be later used for mapping of solver types to problem types, such as by training and configuring a solver selection machine learning model. which solver types (if any) were halted.

Generation of the problem output may comprise updating the outbound solution queue 508, illustrated in FIG. 5A and FIG. 5B, to identify (e.g., the problem output). As multiple input problems may be received with a time period and problem outputs are determined for each input problem, the outbound solution queue 508 is configured to identify (e.g., store) more than one problem output. The outbound solution queue 508 may also store a status associated with each problem output, and a problem output may be added to the outbound solution queue 508 with a "ready to return", "ready to transmit", and/or the like status. Meanwhile, addition of the problem output to the outbound solution queue 508 may comprise updating the inbound problem queue 506. For example, the input problem in the inbound problem queue 506 may be updated to a "finished" status and/or be removed from the inbound problem queue 506.

Generation of the problem output may further comprise scaling down container instances used for determining optimized solutions for the input problem. As the problem output is generated to resolve and handle the input problem, execution of container instances to determine optimized solutions to the input problem is no longer needed, and such container instances may be halted, paused, and/or terminated. In some embodiments, some container instances may be redirected to determining optimized solutions for another input problem identified by the inbound problem queue 506 and may accordingly receive and/or retrieve problem features for the input problem from the inbound problem queue 506. In some instances however, another input problem may be unavailable and with no input problem to determine solutions for, container instances may be terminated. Accordingly, the count of container instances in execution is flexible and based at least in part on the volume of input problems in the inbound problem queue 506.

Returning to FIG. 4, step/operation 405 comprises providing the problem output to the client computing entity 102. As mentioned, the problem output may comprise the optimized solution to the input problem. In various embodiments, the problem output is provided to the client computing entity 102 via a type-agnostic problem solution API response, in response to the type-agnostic problem solving API request (e.g., received in step/operation 401). The type-agnostic problem solution API response is used for providing solutions to different input problems of different problem types. The problem output may be additionally configured to be provided via a display of the client computing entity 102.

In various embodiments, the problem output is provided to the client computing entity 102 via a request management engine 502. The problem output may be specifically provided via the request management engine 502 corresponding to the availability zone 510A-B at which the type-agnostic problem solving API request was received. In providing the problem output, the request management engine 502 is configured to communicate with the outbound solution queue 508 (e.g., receive or retrieve at least the optimized solution from the outbound solution queue 508). After providing the problem output, the outbound solution queue 508 may be updated, and specifically, the problem solution in the outbound solution queue 508 is deleted.

Accordingly, various steps, operations, methods, processes, and/or the like are described herein for determining optimized solutions for input problems in a containerized, cloud-based (e.g., serverless) manner. In an example embodiment, a type-agnostic problem solving API request is received originating from a client computing entity 102. The type-agnostic problem solving API request is processed (e.g., validated), and an input problem defined by the type-agnostic problem solving API is added to the inbound problem queue 506 (e.g., by a request management engine 502). A container management engine 504 is informed of the input problem via the inbound problem queue 506 and generates one or more container instances each associated with a solver type mapped to the input problem (e.g., by the request management engine 502). Execution of the one or more container instances results in generation of a problem output, which may be an aggregation, combination, or based at least in part on various optimized solutions determined according to various solver types. The problem output is added to the outbound solution queue 508, while the input problem is removed from the inbound problem queue 506. The problem output is then provided to the client computing entity 102 via a type-agnostic problem solution API response (e.g., via the request management engine 502).

Various embodiments described herein provide various technical advantages by enabling flexible and elastic determination of optimized solutions for a volume of input problems. In various example instances, computing and processing resources may be diverted, allocated, reserved, and/or the like for particular input problems with priority, and computing and processing resources may be conserved when the volume of input problems is low. Thus, cloud-based and serverless determination of optimized solutions to input problems in various embodiments of the present disclosure result in efficient, flexible, and elastic use of computing and processing resources, which further translates to conservation of time and real-world costs. Further, the use of compute containers for a variety of solver types enable flexibility and scalability, as multiple container instances of a compute container may execute substantially in parallel without excessive consumption of computing and processing resources. Container instances of a compute container may execute to determine an optimized solution to different input problems, thereby enabling handling and processing of multiple input problems efficiently.

In some embodiments, the predictive output may be used (e.g., by a client computing entity) to perform one or more prediction-based actions. Examples of prediction-based actions include automated scheduling, automated generation of notifications, automated load balancing operations for a network/system (e.g., for a transactional network, such as a trucking network), and/or the like. In some embodiments, performing the prediction-based actions comprises generating a prediction output user interface that displays one or more predictive outputs. An operational example of such a prediction output user interface is the prediction output user interface 800 of FIG. 8. As depicted in FIG. 8, the prediction output user interface 800 describes a recommended load delivery schedule for a truck identified by the textbox 801, where the recommended load delivery schedule may be determined based at least in part on one or more predictive outputs.

VI. EXEMPLARY IMPLEMENTATION

Some specific embodiments of a cloud-based multi-domain solver system 101 (sometimes referred to herein as a "constraint optimizer" or "optimized scheduler") are now described with reference to FIGS. 9-18. The solver system 101 is a constraint-based planning tool that tackles key problems faced by asset-intensive organizations, such as, for example, activity scheduling. Using optimization algorithms, it takes limited resources, under varying constraints, and delivers efficient solutions that optimize industry planning goals. This can help reduce cost and improve efficiency by taking the complexities and manual processes out of typical planning (e.g., scheduling) exercises. Exemplary embodiments are configured for industries and capabilities supported through the Infor™ Enterprise Asset Management (EAM) system from Intergraph Corporation and formerly from Infor (US), LLC, although it should be noted that embodiments can be configured for more general use across a variety of systems. In one exemplary embodiment, two industries are supported, namely Maintenance Field Service (MFS) for which embodiments can generate a full day's schedule and route sequence based on available activities and resources such as for crews or personnel to travel to static equipment locations to perform various planned activities and Asset Investment Planning (AIP) for which embodiments can generate asset investment action plans for a given planning horizon, budget, and list of assets/projects to maintain.

FIG. 9 is a legend of symbols used throughout FIGS. 10-18. It should be noted that many of these symbols refer to products or services from other vendors that are used in certain embodiments and any such references are intended to refer to such products or services using their respective trademarks as an adjective and with the appropriate trademark designation (e.g., (R) vs. (TM)) whether used without a trademark designation or used with the incorrect trademark designation. For example, Amazon, AWS, EC2, S3, EventBridge, MQ, and DynamoDB are believed to be trademarks or registered trademarks of Amazon.com, Inc. or its affiliates in the United States and/or other countries and references to such products and services should be interpreted as referring to the corresponding products or services using their respective trademarks as an adjective and with the appropriate trademark designation. It also should be noted that in many cases alternative products or services from other sources can be used in various alternative embodiments (e.g., different cloud services, different database services, different communication protocols, etc.).

FIG. 10 is a schematic diagram showing details of a cloud-based multi-domain solver system 101 in accordance with various embodiments. Among other things, the cloud-based multi-domain solver system 101 includes a request service 1002, a response (solver) service (sometimes referred to herein simply as "the solver") 1004, and a response (solver) preprocessor (sometimes referred to herein simply as "the preprocessor") 1006. The solver 1004 is invoked through various scheduler (domain) plug-ins, which are microservices that can be imbedded in various applications. All of these components are discussed in greater detail below.

FIG. 11 is a schematic diagram showing additional details of the cloud-based multi-domain solver system 101 of FIG. 10 and in particular how the various components are logically and physically interconnected within the cloud deployment environment.

Among other things, the solver system 101 includes a constraint optimizer provisioning API 1008 that validates clients of the system. Specifically, the first time the system receive a specific customer ID, the customer ID is validated via the Provisioning API and is persisted in a database, and then every time a solve request transaction is received from that client, the system can confirm that the client is valid and able to use the solver service.

The constraint scheduler request service 1002 is a webservice wrapped in a Docker™ container that will run in the Infor™ cloud. The primary responsibility of the request service 1002 is to handle webservice requests from various client computing entities 1010 via a public constraint scheduler API, which in this embodiment is a REST API discussed in greater detail below. The request service 1002 is also responsible for spawning instances of the solver 1004 as requests are added to the inbound queue. The system can run multiple instances of the request service 1002, e.g., running in different availability zones (e.g., two instances of the request service 1002).

FIG. 12A is a schematic diagram showing details of the request service 1002 block of FIG. 11. FIG. 12B is a schematic diagram showing two request service 1002 instances running in separate availability zones within a container. Components of the request service 1002 include a REST API interface, a request validator, a controller, a solver initializer, a solution initializer, an abstraction layer that runs Java Message Service (JMS) and Spring Data Redis (SDR), and a logger. The constraint scheduler REST API accepts a request after validation and pushes it to the inbound queue to be processed by the solver. Once the solution is generated by the solver 1004 and placed on the outbound queue, a solution listener of the request service 1002 returns the solution to the client.

The constraint scheduler solver 1004 is a microservice wrapped in a Docker™ container that will run in the Infor™ cloud. The system can spawn separate instances of the solver 1004 such that there is no need to have a persistent presence running in the cloud (e.g., the constraint scheduler instances can be stateless). The constraint schedule solver 1004 is responsible for pulling requests from the inbound queue, creating a solution, and pushing the solution to the outbound queue. Instances of the solver 1004 are dynamically created by the scaling algorithm of the request service 1002. The solver 1004 is also responsible for down-scaling instances that are no longer needed. When a solver 1004 instance completes a solution, it tries to pull another request from the queue. If it is not able to pull a request for a predetermined period of time, it will kill the instance and remove the Fargate container.

FIG. 13A is a schematic diagram showing details of the response (solver) service 1004 block of FIG. 11. FIG. 13B is a schematic diagram showing multiple spawned solver 1004 instances running in an availability zone within a container. Components of the solver 1004 include a request listener that pulls requests from the inbound queue and spawns a solver 1004 instance, a solver engine/controller and constraint mapper for each instance, an abstraction layer that runs Java Message Service (JMS) and Spring Data Redis (SDR) through which solutions are pushed to the outbound queue, and a logger.

As mentioned above, solver 1004 instances are stateless in this exemplary embodiment. All state information is maintained in cloud managed components that have redundancy. The queues ensure that requests are processed before being removed. The system is designed with fault tolerance to remain in operation even if some of the components in the system fail.

In order to deploy applications in multiple availability zones (AZ), each AWS Region is a collection of data centers that are logically grouped into Availability Zones (AZ). AWS Regions provide multiple (typically three) physically separated and isolated Availability Zones which are connected with low latency, high throughput, and highly redundant networking. Each AZ consists of one or more physical data centers. Availability Zones are designed for physical redundancy and provide resilience, enabling uninterrupted performance, even in the event of power outages, Internet downtime, floods, and other natural disasters. Improved fault tolerance is provided using Elastic Load Balancing (ELB), as the ELB service automatically balances traffic across multiple instances in multiple Availability Zones, ensuring that only "healthy" instances receive traffic. The system preferably runs an independent copy of each application stack in two or more Availability Zones, with automated traffic routing to healthy resources. Multiple AZ deployment mitigates against application failure if loss of availability, loss of network connectivity, computer unit failure, or storage failure were to happen in one of the zones. FIG. 13C is a schematic diagram showing Elastic Load Balancing for running an independent copy of each application stack in two Availability Zones. In certain embodiments, multiple AZ deployment is enabled on Redis replication groups. Whether or not multiple AZs are enabled, a failed primary will be detected and replaced automatically. How this takes place, however, varies based on whether or not multiple AZs are enabled. For example, when multiple AZs are enabled, ElastiCache detects the primary node failure and promotes a read replica node with the least replication lag to primary node, the other replicas sync with the new primary node, ElastiCache spins up a read replica in the failed primary's AZ, and the new node syncs with the newly promoted primary. Failing over to a replica node is generally faster than creating and provisioning a new primary node, which allows the solver application to resume writing to your primary node sooner than if Multi-AZ were not enabled.

In certain embodiments, an active/standby broker is comprised of two brokers in two different Availability Zones, configured in a redundant pair. These brokers communicate synchronously with the solver application, and with Amazon EFS (Broker Storage). Typically, only one of the broker instances is active at any time, while the other broker instance is on standby. If one of the broker instances malfunctions or undergoes maintenance, it takes Amazon MQ a short while to take the inactive instance out of service. This allows the healthy standby instance to become active and to begin accepting incoming communication. When you reboot a broker, the fail-over takes only a few seconds. FIG. 13D is a schematic diagram showing an active/standby broker with Amazon EFS storage.

Spring JMS sessions in the solver are configured to use transaction acknowledge mode for messages. If a solver app crashes for any reason, an ActiveMQ server redelivers the request message. This prevents any request message loss in case of an instance crash. A Spring JMS session can be configured with "sessionAcknowledgeMode" set to "AUTO_ACKNOWLEDGE" (default) for automatic message acknowledgment before listener execution with no redelivery in case of exception thrown, "sessionAcknowledgeMode" set to "CLIENT_ACKNOWLEDGE" for automatic message acknowledgment after successful listener execution with no redelivery in case of exception thrown, "sessionAcknowledgeMode" set to "DUPS_OK_ACKNOWLEDGE" for lazy message acknowledgment during or after listener execution with potential redelivery in case of exception thrown, or "sessionTransacted" set to "true" for transactional acknowledgment after successful listener execution with guaranteed redelivery in case of exception thrown.

As discussed above, in various embodiments, determining the selected solver types from the set of per-domain solver types includes providing one or more problem features of the input problem to a solver selection machine learning model for the problem type that is configured to determine the selected solver types from the set of per-domain solver types based at least in part on the problem features of the input problem. In the context of FIGS. 10-11, this function is performed by the response (solver) preprocessor 1006 through a scheduler solver domain that includes a machine learning algorithm model creator and a machine learning algorithm selector.

FIG. 14 is a schematic diagram showing details of the response (solver) preprocessor 1006 block of FIG. 11. As discussed above, the term "solver type" may refer to and describe a data construct that is configured to describe a type of an algorithm, heuristic, method, and/or the like for solving a problem, or for determining a solution for a problem, where the type may be determined based at least in part on a problem type of a corresponding problem. It may be appreciated that a solution for an input problem may be determined using multiple different solver types, each providing a solution with different accuracies and with different efficiencies. Referring to a traveling salesman input problem as an illustrative example, a solution may be determined using a brute-force solver type, a first-fit solver type, a strongest-fit solver type, a Tabu-search solver type, a simulated-annealing solver type, a late-acceptance solver type, a hill-climbing solver type, a strategic oscillation solver type, and/or the like. For polynomial problems, various solver types may describe algorithms, heuristics, methods, and/or the like for solving an input problem, or determining an exact solution for a problem. For nondeterministic polynomial problems, various solver types may describe algorithms, heuristics, methods, and/or the like for both determining a proposed solution to the input problem and for determining a "correctness" or accuracy of the proposed solution for the input problem.

With reference again to FIG. 10, the Algorithm Model Creator runs regularly to generate solver type models from analytics in DynamoDB and stores the models in the S3 cloud. The ML Algorithm Selector loads models from the S3 cloud into memory. The Request Service validates and places a request on inbound queue and flags the request for preprocessing. A Queue Selector filters requests requiring preprocessing and redirects such requests to the Solver Preprocessor. The Solver Preprocessor makes a request to the ML Algorithm Selector to choose an algorithm, removes the original request from the queue, and pushes an updated request back to the queue with preprocessing flag turned off. Generally speaking, the Algorithm Selector analyzes the request to determine the type of problem involved (e.g., a vehicle routing problem), and assuming multiple solver type models are available for the requested problem, the ML Algorithm Selector chooses the best model based on various constraints. The Solver pulls the request from the queue, generates a solution, and pushes the solution to the outbound queue. The Solver records analytics in DynamoDB for future model creation.

In the embodiment shown in FIG. 11, domain-specific client computing entities (clients) 1010 access the constraint optimized scheduler through a multi-domain Representational State Transfer (REST) API that preferably is configured to allow multiple different domain-specific client computing entities to be added to and removed from the system in a plug-and-play fashion, e.g., as support for new domains is added to the system.

FIG. 15 is a schematic diagram showing details of the REST API in accordance with the embodiment of FIG. 11. Different domain-specific client computing entities can utilize different parameters, and the REST API allows such domain-specific client computing entities to utilize this common API by transferring domain-specific information to the constraint optimized scheduler at the time of making a request in a stateless manner, e.g., using JSON or other appropriate representation format.

FIG. 16 is a schematic diagram showing how multiple domain-specific client computing entities can access the solver system via the common REST API. In this example, there is an EAM Crew Dispatch Plugin client, an EAM Asset Investment Plugin client, and room for future plugin clients to be added. The REST API provides an extensible API that allows new functionality to be added without breaking backward compatibility. It uses JSON, a lightweight data-interchange format that is easy for humans to read and write and easy for machines to parse and generate. The API is based on the Open API specification. The REST API is associated with different specifications and properties for different domains, which allows clients to use only the API with the domain that they need and allows the solver system to send responses to the clients with domain-specific information.

In certain embodiments, the REST API includes four primitives, namely a POST/solve primitive to send a request to the solver, a GET/solution/{id} primitive to request the identified solution, a GET/status/{id} primitive so request the status of the identified scheduler execution, and a POST/cancel/{id} primitive to cancel the identified solver execution.

A client sends a solve request to the solver system. This request is a POST because it is expected that some requests will be long running so the response has to be delivered asynchronously. The data payload of the solve request contains static fields for activities and agents and also contains dynamic fields for scheduler type and periods. Using both static and dynamic fields allows the API to be easily extensible. The static field concept means that the fields can't be changed to avoid breaking backward compatibility. However, they can be extended by adding optional fields in the existing object. The dynamic field concept means that a field can be changed and extended without breaking backward compatibility. This can be done by creating a new schema and adding it as a new option of the dynamic field. All dynamic fields must contain an id to be referenced by other json objects.

The system provides the response to the client through a similar call back API. The solution method body has two principal JSON schemas, Assigned Activities and Unassigned Activities. The Assigned Activities are the activities that the Solver was able to successfully assign, The Unassigned Activities were not able to be assigned by the Solver. The schema is extensible to enable additional capabilities.

Solving a Vehicle Routing Problem (VRP) as well as other applications may require access to distance information such as for determining an appropriate route for a theoretical traveling salesman problem. Thus, the system may include a generic distance service through which distance and mapping information (e.g., OpenStreetMap information) can be obtained. FIG. 17 is a schematic diagram showing distance service being used by a VRP solver in accordance with certain embodiments. The distance service utilizes a GraphHopper Routing Service that integrates with OpenStreetMap data and other data. The system can use any of a variety of distance algorithms such as Dijkstra, A*, Landmarks, and Contraction Hierarchies and can include scheduling for any of a variety of transportation modes such as walking, car, bike, and public transit.

FIG. 18 is a flow diagram showing the progression of a solver transaction in accordance with certain embodiments. The client (plug-in) sends a request to the request service via the REST API, which validates the client, and assuming the client is validated, validates the request and pushes the request to the inbound queue. The solver pulls the request from the inbound queue, solves the request, and pushes a solution to the outbound queue. Throughout this process, the solver updates status information, e.g., to indicate when the solver is processing the request and when the solver has finished the request. The response service pulls the solution from the outbound queue and sends the solution to the client via the call back API.

VII. POTENTIAL CLAIMS

Various embodiments of the present invention may be characterized by the potential claims listed in the paragraphs following this paragraph (and before the actual claims provided at the end of the application). These potential claims form a part of the written description of the application. Accordingly, subject matter of the following potential claims may be presented as actual claims in later proceedings involving this application or any application claiming priority based on this application. Inclusion of such potential claims should not be construed to mean that the actual claims do not cover the subject matter of the potential claims. Thus, a decision to not present these potential claims in later proceedings should not be construed as a donation of the subject matter to the public. Nor are these potential claims intended to limit various pursued claims.

Without limitation, potential subject matter that may be claimed (prefaced with the letter "P" so as to avoid confusion with the actual claims presented below) includes:

P1. A computer-implemented method comprising: receiving, using one or more processors, a problem type of an input problem originating from a client computing entity; mapping, using the one or more processors, the problem type to one or more selected solver types; generating, using the one or more processors, one or more container instances of one or more compute containers, each compute container corresponding to a selected solver type; generating, using the one or more processors, a problem output using the one or more container instances; and providing, using the one or more processors, the problem output to the client computing entity, the problem output comprising an optimized solution to the input problem, wherein the problem output may be used to perform one or more prediction-based actions.

P2. The computer-implemented method of claim P 1, wherein mapping the problem type to one or more selected solver types comprises: determining a solver domain based at least in part on the problem type of the input problem and one or more problem features of the input problem; identifying a set of per-domain solver types associated with the solver domain; and determining the one or more selected solver types from the set of per-domain solver types.

P3. The computer-implemented method of claim P2, wherein the problem type of the input problem and the one or more problem features of the input problem are received via a type-agnostic problem solving application programming interface (API) request, and wherein the problem output is provided to the client computing entity via a type-agnostic problem solution API response.

P4. The computer-implemented method of claim P3, wherein the type-agnostic problem solving API request comprises a plurality of static fields each configured to describe problem features across different problem types.

P5. The computer-implemented method of claim P2, wherein determining the selected solver types from the set of per-domain solver types comprises providing one or more problem features of the input problem to a solver selection machine learning model for the problem type that is configured to determine the selected solver types from the set of per-domain solver types based at least in part on the problem features of the input problem.

P6. The computer-implemented method of claim P1, wherein the problem type of the input problem is received at a serverless request management engine native to a server cloud infrastructure and corresponding to one of one or more availability zones.

P7. The computer-implemented method of claim P1, wherein the one or more container instances are managed by a serverless container management engine that is native to a server cloud infrastructure.

P8. The computer-implemented method of claim P7, wherein the serverless container management engine is configured to scale a total count of container instances based at least in part on a total count of the selected solver types.

P9. The computer-implemented method of claim P7, wherein an inbound problem queue is updated to identify the input problem, and wherein the serverless container management engine is configured to scale a total count of container instances for the one or more selected solver types based at least in part on a number of problems identified by the inbound problem queue.

P10. The computer-implemented method of claim P1, wherein generating the problem output comprises: receiving one or more container outputs generated based at least in part on execution of the one or more container instances; and generating the problem output based at least in part on the one or more container outputs.

P11. The computer-implemented method of claim P1, further comprising monitoring execution of each container instance during each execution iteration and halting the execution of a container instance if a per-iteration optimization gain of the execution iteration fails to satisfy a configurable per-iteration optimization gain threshold.

P12. The computer-implemented method of claim P1, wherein execution of a container instance is configured to generate in parallel a container output for each of one or more problems identified by an inbound problem queue.

P13. A cloud-based system comprising one or more processors and one or more memory storage areas, wherein the one or more processors and one or more memory storage areas are configured to be dynamically allocated in a serverless manner, the cloud-based system configured for: receiving a problem type of an input problem originating from a client computing entity; mapping the problem type to one or more selected solver types; generating one or more container instances of one or more compute containers, each compute container corresponding to a selected solver type; generating a problem output using the one or more container instances; and providing the problem output to the client computing entity, the problem output comprising an optimized solution to the input problem, wherein the problem output may be used to perform one or more prediction-based actions.

P14. The cloud-based system of claim P13, wherein mapping the problem type to one or more selected solver types comprises: determining a solver domain based at least in part on the problem type of the input problem and one or more problem features of the input problem; identifying a set of per-domain solver types associated with the solver domain; and determining the one or more selected solver types from the set of per-domain solver types.

P15. The cloud-based system of claim P14, wherein the problem type of the input problem and the one or more problem features of the input problem are received via a type-agnostic problem solving application programming interface (API) request, and wherein the problem output is provided to the client computing entity via a type-agnostic problem solution API response.

P16. The cloud-based system of claim P15, wherein the type-agnostic problem solving API request comprises a plurality of static fields each configured to describe problem features across different problem types.

P17. The cloud-based system of claim P15, wherein determining the selected solver types from the set of per-domain solver types comprises providing one or more problem features of the input problem to a solver selection machine learning model for the problem type that is configured to determine the selected solver types from the set of per-domain solver types based at least in part on the problem features of the input problem.

P18. The cloud-based system of claim P13, wherein the problem type of the input problem is received at a serverless request management engine corresponding to one of one or more availability zones.

P19. The cloud-based system of claim P13, wherein the one or more container instances are managed by a serverless container management engine that is native to a server cloud infrastructure.

P20. A computer program product comprising at least one non-transitory computer-readable storage medium having computer-readable program code portions stored therein, the computer-readable program code portions configured for: receiving a problem type of an input problem originating from a client computing entity; mapping the problem type to one or more selected solver types; generating one or more container instances of one or more compute containers, each compute container corresponding to a selected solver type; generating a problem output using the one or more container instances; and providing the problem output to the client computing entity, the problem output comprising an optimized solution to the input problem, wherein the problem output may be used to perform one or more prediction-based actions.

VIII. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claim concepts. Although specific terms are employed herein, they are used in a generic and descriptive sense only and not for purposes of limitation.

What is claimed is:
1. A computer-implemented method comprising:
receiving a problem type of an input problem and one or more problem features of the input problem originating from a client computing entity at a serverless request management engine native to a server cloud infrastructure via a type-agnostic problem solving application programming interface (API) request comprising a plurality of static fields configured to describe problem features across a plurality of different problem types;
selecting a solver type for the input problem based on the problem type and the one or more problem features;

causing, by the serverless request management engine, within the server cloud infrastructure, execution of a container instance of a compute container corresponding to the solver type;

receiving a problem output from the container instance comprising an optimized solution to the input problem; and providing, by the serverless request management engine, the problem output for transmission to the client computing entity, wherein the problem output is provided to the client computing entity via a type-agnostic problem solution API response.

2. The computer-implemented method of claim 1, wherein the container instance is one of a plurality of container instances, each container instance corresponding to a different solver type for the problem type.

3. The computer-implemented method of claim 2, wherein the serverless request management engine is configured to scale a total count of container instances based at least in part on a total count of the solver types.

4. The computer-implemented method of claim 2, wherein an inbound problem queue is updated to identify the input problem, and wherein the serverless container management engine is configured to scale a total count of container instances for the one or more solver types based at least in part on a number of problems identified by the inbound problem queue.

5. The computer-implemented method of claim 2, further comprising:

monitoring execution of each container instance during each execution iteration and halting the execution of a container instance if a per-iteration optimization gain of the execution iteration fails to satisfy a configurable per-iteration optimization gain threshold.

6. The computer-implemented method of claim 2, wherein execution of a container instance is configured to generate in parallel a container output for each of one or more problems identified by an inbound problem queue.

7. The computer-implemented method of claim 1, wherein selecting a solver type for the input problem based on the problem type and the one or more problem features comprises:

determining a solver domain based at least in part on the problem type of the input problem and the one or more problem features of the input problem;

identifying a set of per-domain solver types associated with the solver domain;

determining one or more solver types from the set of per-domain solver types; and selecting the solver type from the one or more solver types.

8. The computer-implemented method of claim 7, wherein determining the selected solver types from the set of per-domain solver types comprises providing one or more problem features of the input problem to a solver selection machine learning model for the problem type that is configured to determine the selected solver types from the set of per-domain solver types based at least in part on the problem features of the input problem.

9. The computer-implemented method of claim 1, wherein the serverless request management engine corresponds to one of one or more availability zones.

10. The computer-implemented method of claim 1, wherein generating the problem output comprises:

receiving one or more container outputs generated based at least in part on execution of the container instance; and generating the problem output based at least in part on the one or more container outputs.

11. A cloud-based system comprising:

at least one memory storing instructions; and at least one hardware processor native to a server cloud infrastructure to execute the instructions to implement a serverless request management engine native to a server cloud infrastructure, the serverless request management engine configured to perform processes comprising:

receiving a problem type of an input problem and one or more problem features of the input problem originating from a client computing entity via a type-agnostic problem solving application programming interface (API) request comprising a plurality of static fields configured to describe problem features across a plurality of different problem types;

selecting a solver type for the input problem based on the problem type and the one or more problem features;

causing, by the serverless request management engine, execution of a container instance of a compute container corresponding to the solver type;

receiving a problem output from the container instance comprising an optimized solution to the input problem; and providing the problem output for transmission to the client computing entity, wherein the problem output is provided to the client computing entity via a type-agnostic problem solution API response.

12. The cloud-based system of claim 11, wherein the compute container is one of a plurality of compute containers, each compute container corresponding to a different solver type for the problem type.

13. The cloud-based system of claim 11, wherein selecting a solver type for the input problem based on the problem type and the one or more problem features comprises:

determining a solver domain based at least in part on the problem type of the input problem and the one or more problem features of the input problem;

identifying a set of per-domain solver types associated with the solver domain;

determining one or more solver types from the set of per-domain solver types; and selecting the solver type from the one or more solver types.

14. The cloud-based system of claim 13, wherein determining the selected solver types from the set of per-domain solver types comprises providing one or more problem features of the input problem to a solver selection machine learning model for the problem type that is configured to determine the selected solver types from the set of per-domain solver types based at least in part on the problem features of the input problem.

15. The cloud-based system of claim 11, wherein the serverless request management engine corresponds to one of one or more availability zones.

16. A computer program product comprising at least one tangible non-transitory computer-readable storage medium having computer-readable program code portions stored therein which, when executed on one or more processors, cause the one or more processors to implement a serverless request management engine native to a server cloud infrastructure that performs processes comprising:

receiving a problem type of an input problem and one or more problem features of the input problem originating from a client computing entity via a type-agnostic problem solving application programming interface (API) request comprising a plurality of static fields configured to describe problem features across a plurality of different problem types;

selecting a solver type for the input problem based on the problem type and the one or more problem features;

causing, by the serverless request management engine, execution of a container instance of a compute container corresponding to the solver type;

receiving a problem output from the container instance comprising an optimized solution to the input problem; and providing the problem output for transmission to the client computing entity, wherein the problem output is provided to the client computing entity via a type-agnostic problem solution API response.

* * * * *